(12) United States Patent
Fekete

(10) Patent No.: US 12,471,823 B2
(45) Date of Patent: Nov. 18, 2025

(54) METHOD AND SYSTEM FOR ALIGNING NEUROPHYSIOLOGICAL SENSORS

(71) Applicant: EEG-SENSE Ltd., Kiryat Ono (IL)

(72) Inventor: Tomer Fekete, Tel Aviv (IL)

(73) Assignee: EEG-SENSE Ltd., Kiryat Ono (IL)

( * ) Notice: Subject to any disclaimer, the term of this patent is extended or adjusted under 35 U.S.C. 154(b) by 0 days.

(21) Appl. No.: 18/852,467

(22) PCT Filed: Mar. 30, 2023

(86) PCT No.: PCT/IL2023/050332
§ 371 (c)(1),
(2) Date: Sep. 29, 2024

(87) PCT Pub. No.: WO2023/187785
PCT Pub. Date: May 10, 2023

(65) Prior Publication Data
US 2025/0099008 A1 Mar. 27, 2025

Related U.S. Application Data

(60) Provisional application No. 63/325,163, filed on Mar. 30, 2022.

(51) Int. Cl.
*A61B 5/291* (2021.01)
*A61B 5/256* (2021.01)
*G06T 7/33* (2017.01)

(52) U.S. Cl.
CPC ............. *A61B 5/291* (2021.01); *A61B 5/256* (2021.01); *G06T 7/337* (2017.01);
(Continued)

(58) Field of Classification Search
CPC ......... A61B 5/291; A61B 5/256; G06T 7/337; G06T 2200/04; G06T 2207/10012;
(Continued)

(56) References Cited

U.S. PATENT DOCUMENTS 7,190,826 B2 * 3/2007 Russell .................. G06T 7/596
356/602
9,814,426 B2 11/2017 Connor
(Continued)

FOREIGN PATENT DOCUMENTS

WO WO 2020/255142 12/2020
WO WO 2023/187785 10/2023

OTHER PUBLICATIONS

Klem et al. "The Ten Twenty Electrode System: International Federation of Societies for Electroencephalography and Clinical Neurophysiology", American Journal of EEG Technology, 1(1): 13-19, Published Online Feb. 23, 2015.
(Continued)

*Primary Examiner* — Adam Z Minchella

(57) ABSTRACT

A method of aligning a wearable device having a set of neurophysiological sensors on a head of a subject, comprises capturing a three-dimensional (3D) facial image of the subject, and a 3D image of the wearable device while being placed on a scalp of the subject. Facial landmarks are identified on the facial image, and the images are co-registered based at least in part on the identified facial landmarks. A trained machine learning procedure is fed with the facial landmarks to produce coordinates of scalp landmarks, and an alignment of the wearable device on the scalp is corrected to match coordinates of the scalp landmarks with locations of the neurophysiological sensors.

20 Claims, 7 Drawing Sheets

(52) U.S. Cl.
CPC .............................. *G06T 2200/04* (2013.01); *G06T 2207/10012* (2013.01); *G06T 2207/10016* (2013.01); *G06T 2207/10028* (2013.01); *G06T 2207/20081* (2013.01); *G06T 2207/30201* (2013.01)

(58) Field of Classification Search
CPC . G06T 2207/10016; G06T 2207/10028; G06T 2207/20081; G06T 2207/30201
See application file for complete search history.

(56) References Cited

U.S. PATENT DOCUMENTS

| | | | | |
|---|---|---|---|---|
| 2010/0036233 | A1* | 2/2010 | Zhu | A61B 5/055 |
| | | | | 382/128 |
| 2014/0039658 | A1 | 2/2014 | Bangera et al. | |
| 2015/0257674 | A1 | 9/2015 | Jordan et al. | |
| 2016/0081616 | A1 | 3/2016 | Li | |
| 2017/0135640 | A1* | 5/2017 | Gunasekar | A61B 5/6843 |
| 2019/0000338 | A1* | 1/2019 | Van Den Ende | A61B 5/6843 |
| 2021/0383603 | A1* | 12/2021 | Zagorchev | A61B 5/4094 |

OTHER PUBLICATIONS

International Search Report and the Written Opinion Dated Jul. 6, 2023 From the International Searching Authority Re. Application No. PCT/IL2023/050332 (14 Pages).

Clausner et al. "Photogrammetry-Based Head Digitization for Rapid and Accurate Localization of EEG Electrodes and MEG Fiducial Markers Using a Single Digital SLR Camera", Frontiers in Neuroscience, 11(264): 1-12, May 16, 2017.

Echallier et al. "Computer-Assisted Placement of Electrodes on the Human Head", Electroencephalography and Clinical Neurophysiology, 82(2): 160-163, Feb. 1992.

He et al. "A Practical Method for Quickly Determining Electrode Positions in High-Density EEG Studies", Neuroscience Letters, 541: 73-76, Apr. 29, 2013.

Keil et al. "Committee Report: Publication Guidelines and Recommendations for Studies Using Electroencephalography and Magnetoencephalography", Psychophysiology, 51(1): 1-21, Oct. 22, 2013.

Koessler et al. "EEG-MRI Co-registration and Sensor Labeling Using a 3D Laser Scanner", Annals of Biomedical Engineering, 39(3):983-995, Dec. 8, 2010.

Lagerlund et al. "Determination of 10-20 System Electrode Locations Using Magnetic Resonance Image Scanning with Markers", Electroencephalography and Clinical Neurophysiology, 86(1): 7-14, Jan. 1993.

Reis et al. "Using a Motion Capture System for Spatial Localization of EEG Electrodes", Frontiers of Neurosciences, 9(130): 1-8, Apr. 20, 2015.

Swerdoff et al. "Spatiotemporal Visualization of Neuromagnetic Data", Electroencephalography and Clinical Neurophysiology, 86(1),; 51-57, Jan. 1993.

Xiao et al. "Semi-Automatic 10/20 Identification Method for MRI-Free Probe Placement in Transcranial Brain Mapping Techniques", Frontiers in Neuroscience, 11(4): 1-11, Jan. 27, 2017.

International Preliminary Report on Patentability Dated Oct. 10, 2024 From the International Bureau of WIPO Re. Application No. PCT/IL2023/050332. (9 Pages).

\* cited by examiner

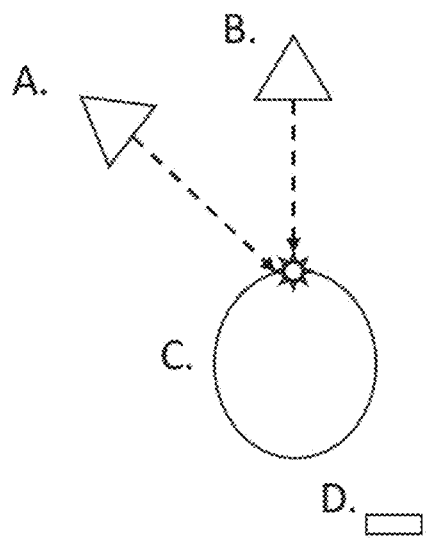
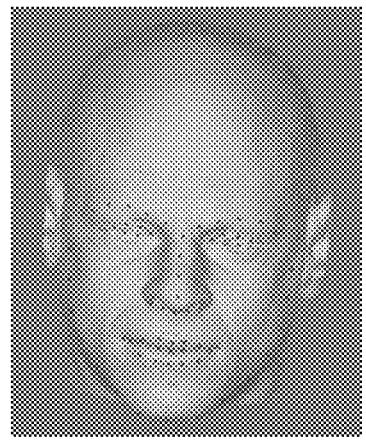
FIG. 6　　　　　FIG. 7
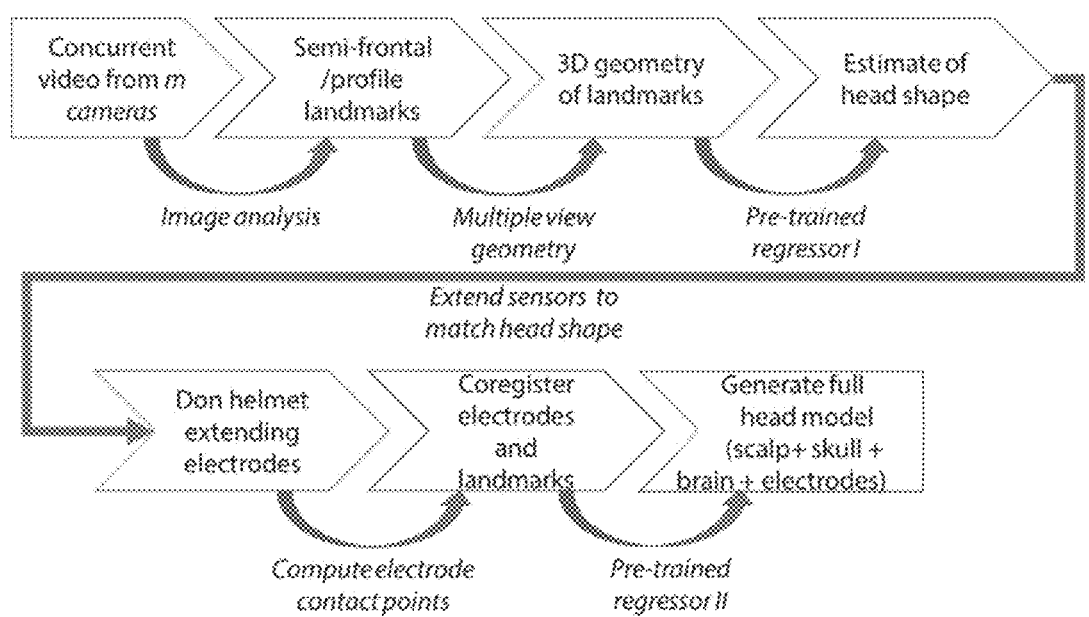
FIG. 8

METHOD AND SYSTEM FOR ALIGNING NEUROPHYSIOLOGICAL SENSORS

RELATED APPLICATIONS

This application is a National Phase of PCT Patent Application No. PCT/IL2023/050332 having International filing date of Mar. 30, 2023, which claims the benefit of priority under 35 USC § 119(e) of U.S. Provisional Patent Application No. 63/325,163 filed on Mar. 30, 2022. The contents of the above applications are all incorporated by reference as if fully set forth herein in their entirety.

FIELD AND BACKGROUND OF THE INVENTION

The present invention, in some embodiments thereof, relates to neurophysiology and, more particularly, but not exclusively, to a method and system for aligning neurophysiological sensors, such as, but not limited to, EEG sensors.

The brain is a complex structure of nerve cells that produce signals called excitatory post synaptic potentials (EPSP). These potentials summate in the cortex and extend through the coverings of the brain to the scalp, where they can be measured using appropriate electrodes. Rhythmical measured activity represents postsynaptic cortical neuronal potentials which are synchronized by the complex interaction of large populations of cortical cells. EEG, a noninvasive recording technique, is one of the commonly used systems for monitoring brain activity. EEG data is simultaneously collected from a multitude of channels at a high temporal resolution, yielding high dimensional data matrices for the representation of brain activity. In addition to its unsurpassed temporal resolution, EEG is non-invasive, wearable, and more affordable than other neuroimaging techniques.

In some techniques, EEG signals are acquired by headsets.

One very common example of an EEG headset used in medical applications is a standard EEG cap, which includes a cap made of stretchable fabric that is put on the subject's head like a swimming cap. The cap has surface electrodes positioned throughout the cap in a manner such that they come in contact with surface of the subject's head.

Various techniques have been suggested to reproducibly position the EEG electrodes on the head. These include manual techniques [Klem et al., 1999, The International Federation of Clinical Neurophysiology, Electroencephalography and clinical neurophysiology, Supplement 52, 3-6; Keil et al. (2014), Committee report: publication guidelines and recommendations for studies using electroencephalography and magnetoencephalography, Psychophysiology 51, 1-21, doi:10.1111/psyp.12147; He et al., 2013, Neuroscience letters 541, 73-76, doi:10.1016/j.neulet.2013.02.028] and automatic or semi-automatic techniques [Xiao et al., 2017, Frontiers in neuroscience 11, 4, doi:10.3389/fnins.2017.00004; Swerdloff et al., 1993, Electroencephalography and clinical neurophysiology 86, 51-57, doi: 10.1016/0013-4694(93)90066-5; Echallier et al., 1992, Electroencephalography and clinical neurophysiology 82, 160-163, doi:10.1016/0013-4694(92)90161-a; Lagerlund et al., 1993, Electroencephalography and clinical neurophysiology 86, 7-14, doi:10.1016/0013-4694(93)90062-z; Clausner et al., 2017, Frontiers in neuroscience 11, 264, doi: 10.3389/fnins.2017.00264; Reis et al., 2015, Frontiers in neuroscience 9, 130, doi:10.3389/fnins.2015.00130; Koessler et al., 2011, Annals of biomedical engineering 39, 983-995, doi:10.1007/s10439-010-0230-0].

SUMMARY OF THE INVENTION

According to an aspect of some embodiments of the present invention there is provided a method of aligning a wearable device having a set of neurophysiological sensors on a head of a subject. The method comprises: capturing a three-dimensional (3D) facial image of the subject, and a 3D image of the wearable device while being placed on a scalp of the subject. The method further comprises identifying facial landmarks on the facial image, and co-registering the images, based at least in part on the identified facial landmarks. The method additionally comprises feeding a first trained machine learning procedure with the facial landmarks to produce coordinates of scalp landmarks, and correcting an alignment of the wearable device on the scalp to match coordinates of the scalp landmarks with locations of the neurophysiological sensors.

According to some embodiments of the invention the 3D images are video images, and the method is executed for each of a plurality of frames belonging to the video images.

According to some embodiments of the invention the capturing of the 3D images comprises capturing a plurality of two-dimensional images from a plurality of viewpoints.

According to some embodiments of the invention the 3D images are captured, at least in part, by range imaging.

According to some embodiments of the invention the wearable device comprises a display controlled by a circuit, and the method comprises transmitting to the circuit alignment information pertaining to an alignment between the coordinates of the scalp landmarks and the locations of the neurophysiological sensors, for displaying of the alignment information on the display.

According to some embodiments of the method comprises individually varying locations of the sensors with respect to the wearable device, to match the coordinates of the scalp landmarks with the varied locations.

According to some embodiments of the method comprises individually varying locations of the sensors with respect to the wearable device, and receiving, in closed loop, the varied locations, wherein the correcting is based on position data of the sensors relative to the wearable device.

According to some embodiments of the invention the wearable device comprises actuators configured for varying the locations, and the method comprises receiving the position data from the actuators.

According to some embodiments of the invention the locations of the sensors are varied, at least in part, by voluntarily activating the actuators.

According to some embodiments of the invention the locations of the sensors are varied, at least in part, by automatically activating the actuators.

According to some embodiments of the invention the wearable device comprises an arrangement of displacement sensors configured for sensing displacements of the sensor relative to the wearable device, and the method comprises receiving the position data from the displacement sensors.

According to some embodiments of the method comprises obtaining neurophysiological signals from the sensors responsively to sensory and/or haptic stimulation applied to the subject, and extracting evoked response fields from the neurophysiological signals; feeding a second trained machine learning procedure with the evoked response fields and the facial landmarks, to produce coordinates of brain landmarks; and generating output pertaining at least to a structure of a brain of the subject based on the brain landmarks.

According to some embodiments of the invention the second trained machine learning procedure is also fed by the locations of the sensors.

According to some embodiments of the method comprises applying triangulation to the evoked response fields so as to calculate a location of at least one brain structure, wherein the second trained machine learning procedure is also fed by the calculated location of the at least one brain structure.

According to some embodiments of the method comprises receiving input pertaining to demographic characteristics of the subject, wherein the second trained machine learning procedure is also fed by the demographic characteristics.

According to some embodiments of the method comprises receiving a medical record pertaining to the subject, wherein the second trained machine learning procedure is also fed by the medical record.

According to some embodiments of the method comprises calculating a cortical symmetry axis based on the evoked response fields, wherein the second trained machine learning procedure is also fed by the calculated cortical symmetry axis.

According to some embodiments of the invention the second trained machine learning procedure is trained to provide output which comprises parameters characterizing a transformation between a template head model and the head of the subject, and the method comprises accessing a computer readable medium storing the template head model and applying the transformation to the template head model, thereby providing an output three-dimensional model describing the shape of the scalp and the brain structure.

According to an aspect of some embodiments of the present invention there is provided a method of manufacturing a personally adapted wearable device for neurophysiology. The method comprises: capturing a three-dimensional (3D) facial image of the subject; identifying facial landmarks on the facial image; and feeding a first trained machine learning procedure with the facial landmarks to produce output indicative of a shape of the scalp, a size of the scalp, and a plurality of landmark coordinates of scalp landmarks. The method further comprises manufacturing the wearable device based on the output, wherein a shape and a size of a surface of the wearable device substantially match the shape and the size of the scalp, and wherein the wearable device comprises a set of neurophysiological sensors distributed over the surface at locations substantially matching the landmark coordinates.

According to an aspect of some embodiments of the present invention there is provided a system for neurophysiology. The system comprises a wearable device having a set of neurophysiological sensors distributed over its surface; and a display device mounted on the surface, and configured to display, while the wearable device is worn on a scalp of a subject, an alignment state of the wearable device with respect to the scalp.

According to some embodiments of the invention the system comprises: an imaging system for capturing a three-dimensional (3D) facial image of the subject, and a 3D image of the wearable device while being on a scalp of a subject; and a data processor having a circuit configured to process the facial image for identifying facial landmarks, to co-register the images based at least in part on the identified facial landmarks, to feed the facial landmarks into a first trained machine learning procedure producing coordinates of scalp landmarks, and to calculate the alignment state by comparing the coordinates of the scalp landmarks and locations of the neurophysiological sensors.

According to an aspect of some embodiments of the present invention there is provided a system for determining an alignment state of a wearable device on a scalp of a subject. The wearable device has a set of neurophysiological sensors distributed over its surface, and a display device mounted on the surface. The system comprises: an imaging system for capturing a three-dimensional (3D) facial image of the subject, and a 3D image of the wearable device while being on a scalp of a subject; and a data processor having a circuit configured to process the facial image for identifying facial landmarks, to co-register the images based at least in part on the identified facial landmarks, to feed the facial landmarks into a first trained machine learning procedure producing coordinates of scalp landmarks, to calculate the alignment state by comparing the coordinates of the scalp landmarks and locations of the neurophysiological sensors, and to transmit the calculated alignment state to the display device.

According to some embodiments of the invention the imaging system is configured to generate 3D video images, and the data processor is configured to process individual frames of the video images.

According to some embodiments of the invention the imaging system is configured to capture a plurality of two-dimensional images from a plurality of viewpoints.

According to some embodiments of the invention the imaging system is, or comprises, a range imaging system.

According to some embodiments of the invention the imaging system is mounted on the wearable device.

According to some embodiments of the invention the first trained machine learning procedure is trained to provide output indicative of at least a shape of the scalp, based on the facial landmarks.

According to some embodiments of the invention the output comprises parameters characterizing a transformation between the scalp and a template scalp. According to some embodiments of the invention the method comprises accessing a computer readable medium storing the template scalp and applying the transformation to the template scalp, thereby providing the shape of the scalp. According to some embodiments of the invention the data processor is configured to access a computer readable medium storing the template scalp, and to apply the transformation to the template scalp, thereby providing the shape of the scalp.

According to some embodiments of the invention the wearable device comprises a set of controllable actuators for varying locations of the sensors with respect to the surface, and a controller configured for individually controlling each actuator or group of actuators, wherein the data processor is configured for transmitting a control signal to the controller to individually vary locations of the sensors so as to match the coordinates of the scalp landmarks with the varied locations.

According to some embodiments of the invention the data processor is configured for receiving, in closed loop, position data of the sensors, to recalculate the alignment state based on the position data, and to transmit the recalculated alignment state to the display device.

According to some embodiments of the invention the data processor is configured for receiving the position data from the actuators.

According to some embodiments of the invention the wearable device comprises an arrangement of displacement sensors configured for sensing displacements of the sensor relative to the wearable device, and the data processor is configured for receiving the position data from the displacement sensors.

According to some embodiments of the invention the data processor is also configured to obtain neurophysiological signals from the sensors responsively to sensory and/or haptic stimulation applied to the subject, to extract evoked response fields from the neurophysiological signals, to feed the evoked response fields and the facial landmarks into a second trained machine learning procedure producing coordinates of brain landmarks, and to generate output pertaining at least to a structure of a brain of the subject based on the brain landmarks.

According to some embodiments of the invention the data processor is also configured to feed the second trained machine learning procedure by the locations of the sensors.

According to some embodiments of the invention the data processor is configured to apply triangulation to the evoked response fields so as to calculate a location of at least one brain structure, and to feed the calculated location of the at least one brain structure into the second trained machine learning procedure.

According to some embodiments of the invention the data processor is configured to receive input pertaining to demographic characteristics of the subject, to feed the demographic characteristics into the second trained machine learning procedure.

According to some embodiments of the invention the data processor is configured to receive a medical record pertaining to the subject, and to feed the medical record to the second trained machine learning procedure.

According to some embodiments of the invention the data processor is configured to calculate a cortical symmetry axis based on the evoked response fields, and to feed the cortical symmetry axis into the second trained machine learning procedure.

According to some embodiments of the invention the second trained machine learning procedure is trained to provide output which comprises parameters characterizing a transformation between a template head model and the head of the subject, and wherein the data processor is configured to access a computer readable medium storing the template head model, to apply the transformation to the template head model, and to generate an output three-dimensional model describing the shape of the scalp and the brain structure and the sensor.

According to an aspect of some embodiments of the present invention there is provided a wearable device for measuring signals from a brain. The wearable device comprises: a wearable body adapted to fit over a scalp; a plurality of electrodes mounted on the wearable body; a plurality of controllable actuators for applying force to the electrodes; a controller configured for individually controlling each actuator or group of actuators to apply force to at least one electrode; and an arrangement of displacement sensors configured for sensing displacements of the electrodes relative to the wearable body.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings:

FIGS. 1A-D are schematic illustrations of a representative example of a wearable device for measuring EEG, according to some embodiments of the present invention;

FIG. 6 is a schematic illustration of a prototype system used in experiments performed according to some embodiments of the present invention;

FIG. 7 is a schematic illustration of facial landmarks obtained in experiments performed according to some embodiments of the present invention;

FIG. 8 is a schematic illustration describing the operational principles of the prototype system, according to some embodiments of the present invention;

Figure 9:
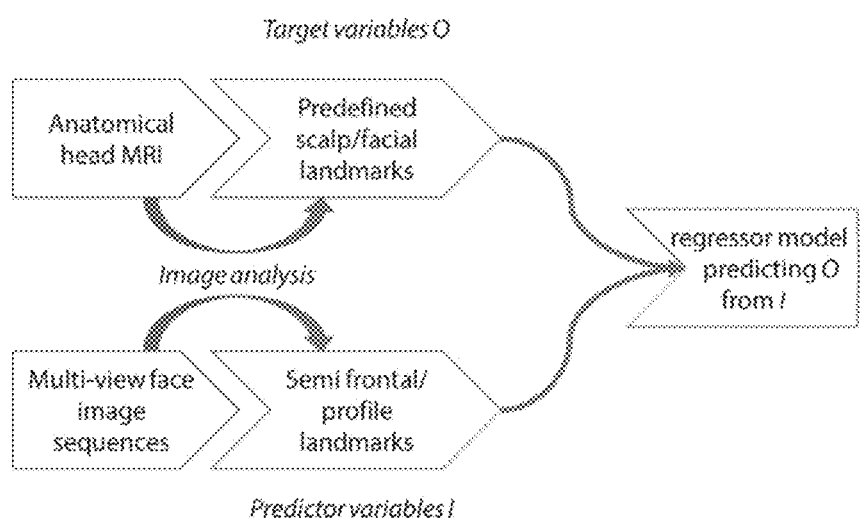
Figure 10:
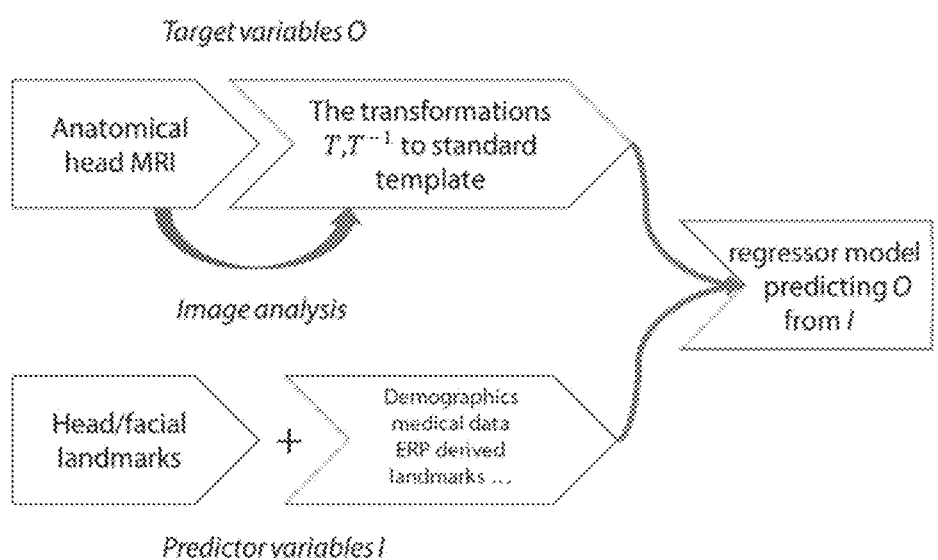

FIG. 9 is a schematic illustration describing the operational principles of a first trained machine learning procedure used by the prototype system, according to some embodiments of the present invention; and FIG. 10 is a schematic illustration describing the operational principles of a second trained machine learning procedure used by the prototype system, according to some embodiments of the present invention.

DESCRIPTION OF SPECIFIC EMBODIMENTS OF THE INVENTION

The present invention, in some embodiments thereof, relates to neurophysiology and, more particularly, but not exclusively, to a method and system for aligning neurophysiological sensors, such as, but not limited to, EEG sensors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments provide a technique useful for aligning a wearable device having a set of EEG sensors on a head of a subject. A representative example of a wearable device 40 which can be aligned using the technique of the present embodiments is illustrated in FIGS. 1A-D, described herein. A wearable device which can enact wearable device 40 is also disclosed in WO2020/255442 the contents of which are hereby incorporated by reference.

Figures 1A, 1B:
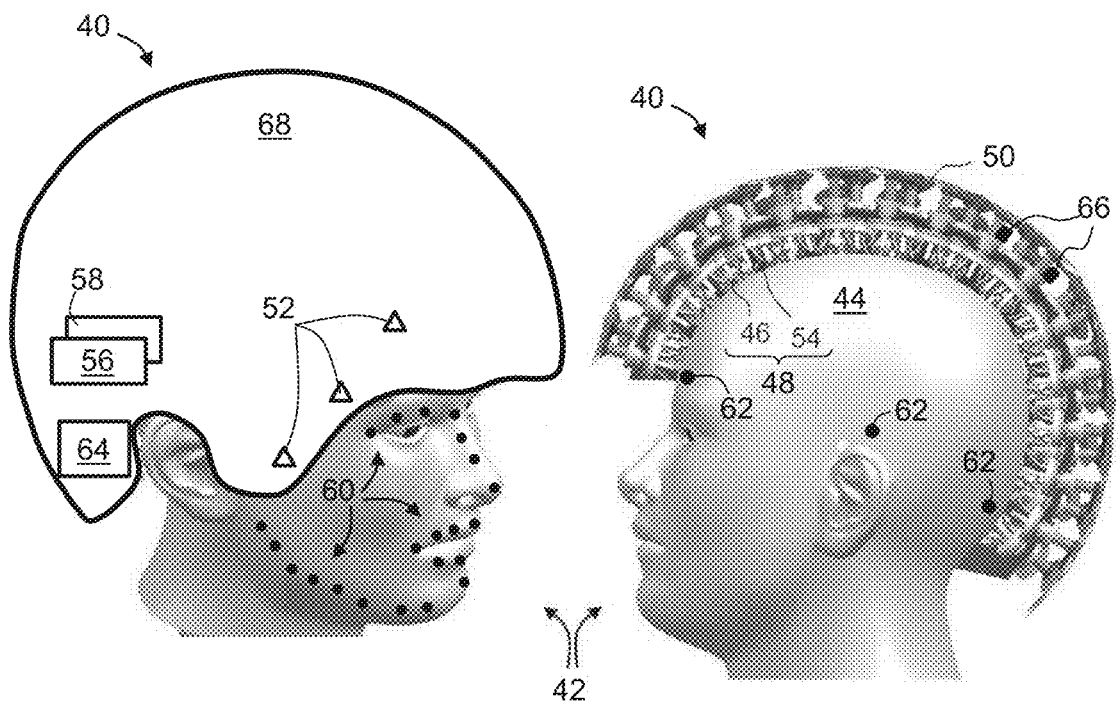
Figures 1C, 1D:
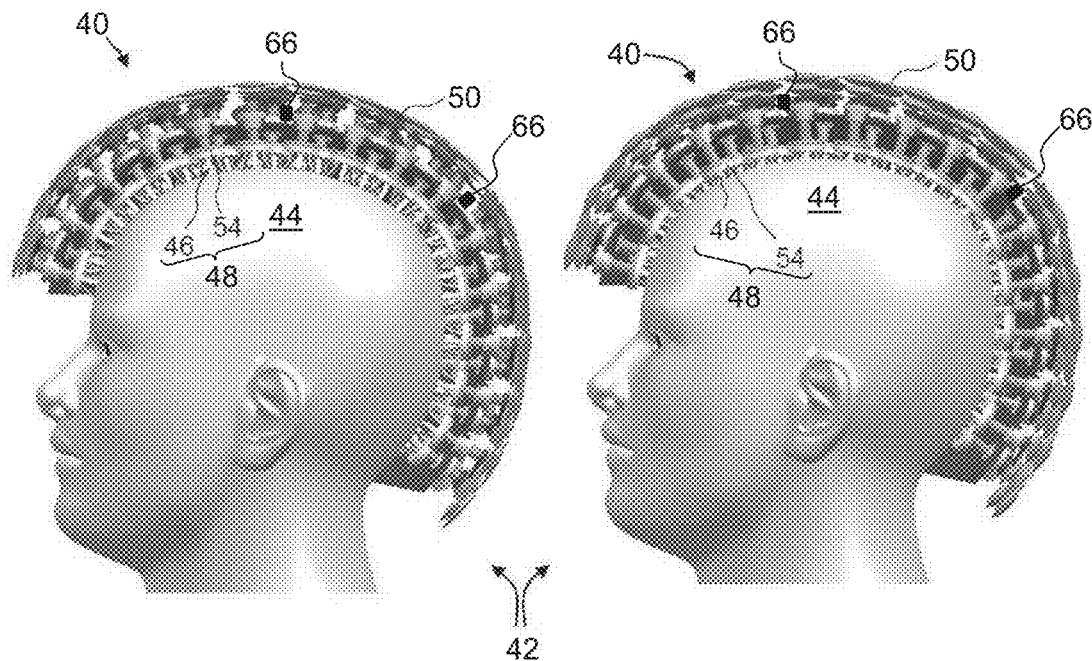

With reference to the drawings, FIGS. 1A-D schematically illustrate wearable device 40 once mounted on a scalp 44 of a subject 42, where FIG. 1A is a perspectives view, and FIGS. 1B-D are cross-sectional views. Wearable device 40 is optionally and preferably adapted to fit as much as possible over scalp 44.

The present embodiments also provide a technique suitable for manufacturing a personally adapted wearable device, further detailed hereinunder.

Wearable device 40 can be made of any material that can be worn over the scalp, such as, but not limited to, a synthetic fabric, molded plastic, fiberglass, reinforced fiberglass (e.g., reinforced with Kevlar or carbon fibers). In some embodiments of the present invention wearable device 40 is rigid. Wearable device 40 comprises a plurality of neurophysiological sensors 48 distributed over its surface. Wearable device 40 can also be provided in the form of a flexible, elastic or rigid net in which case sensors 48 can be mounted on, or integrated with the net.

Each of sensors 48 is an on-scalp sensor capable of sensing a neurophysiological signal from the brain. Representative examples include, without limitation, electroencephalogram (EEG) sensors, magnetoencephalogram (MEG) sensors, and near infrared (NIR) sensors.

It is expected that during the life of this patent many relevant on-scalp sensors for sensing neurophysiological signals from the brain will be developed and the scope of the term neurophysiological sensor is intended to include all such new technologies a priori.

While the embodiments below are described with a particular emphasis to EEG sensors, it is to be understood that other types of neurophysiological sensors are also contemplated in some embodiments of the present invention.

Each of at least a portion of sensors 48 typically comprises one or more sensing electrodes 46 mounted on a sensor body 54. In some embodiments of the present invention sensing electrodes 46 are in the form of legs capable of bending or collapse towards scalp 44 once wearable device 40 is worn thereon. Optionally and preferably, the legs bend or collapse once a force is applied to sensor body 54.

In the illustrated embodiment, wearable device 40 comprises a plurality of controllable actuators 50 for applying force to sensor body 54. Wearable device 40 optionally and preferably also comprises a controller 64 configured for controlling actuators 50 to apply a force configured to press the electrodes to the scalp. Controller 64 can control each of actuators 50 individually, or it can control individual groups of actuators 50. For clarity of presentation, communication lines between controller 64 and actuators 50 are not shown. Controller 64 can receive control signals from a computer (not shown) automatically and/or in response to a user input. In some embodiments, controller 64 is, or comprises, a manually operated controller, in which case the control on actuators 50 is performed voluntarily by a human operator.

Actuators 50 are typically designed and configured to apply a compression force. Actuators 50 can in some embodiments of the present invention be designed and configured to apply a periodic (e.g., sinusoidal) force so as to vibrate the electrodes or to generate a hammering effect, facilitating better penetration of the electrodes through the hair and better spread of the contact area with the scalp. Actuators 50 can in some embodiments of the present invention be designed and configured to apply a rotating force so as to rotate the electrodes paving their path through hair. In the schematic illustration of FIG. 1B actuators 50 are in a relaxed state in which no force is applied, and in FIGS. 1C and 1D actuators 50 apply a force, wherein the state shown in FIG. 1D corresponds to a stronger force compared to the state shown in FIG. 1C, thereby bringing body 54 closer to scalp 44 and applying more strain to electrodes 46 creating higher footprint areas between the tips of the electrodes and the scalp.

In some embodiments of the present invention wearable device 40 comprises an arrangement of displacement sensors 66 configured for sensing the displacements of sensor bodies 54 of neurophysiological sensors 48. Displacement sensors 66 can provide signals indicative of the displacement of sensor bodies 54 relative to their position when actuators 50 are in their relaxed state (FIG. 1B), or relative to the body 68 of wearable device 40 on which sensors 48 are mounted. The number of displacement sensors 66 is preferably the same as the number of neurophysiological sensors 48 of wearable device 40, in which case the displacement of each neurophysiological sensor can be sensed by a respective displacement sensor. Alternatively, the number of displacement sensors 66 can differ from the number of neurophysiological sensors 48. For example, wearable device 40 can include fewer displacement sensors 66, so that not all the neurophysiological sensors are monitored with respect to their displacement. Wearable device 40 can alternatively allow the displacement of each neurophysiological sensor to be monitored by more than one displacement sensor. This can be achieved either by incorporating in device 40 more displacement sensors than neurophysiological sensors, or by allowing some of the neurophysiological sensors not to be monitored.

Displacement sensors 66 can be of any type known in the art, including, without limitation, micro-pneumatic displacement transducers, electromechanical displacement transducers (e.g., Linear Variable Differential Transformer displacement transducers), inductive (eddy current) displacement transducers, contactless displacement sensors (e.g., capacitive displacement sensors), micro Hall Effect displacement transducers, infrared (IR) transducers, and the like.

Figure 5:
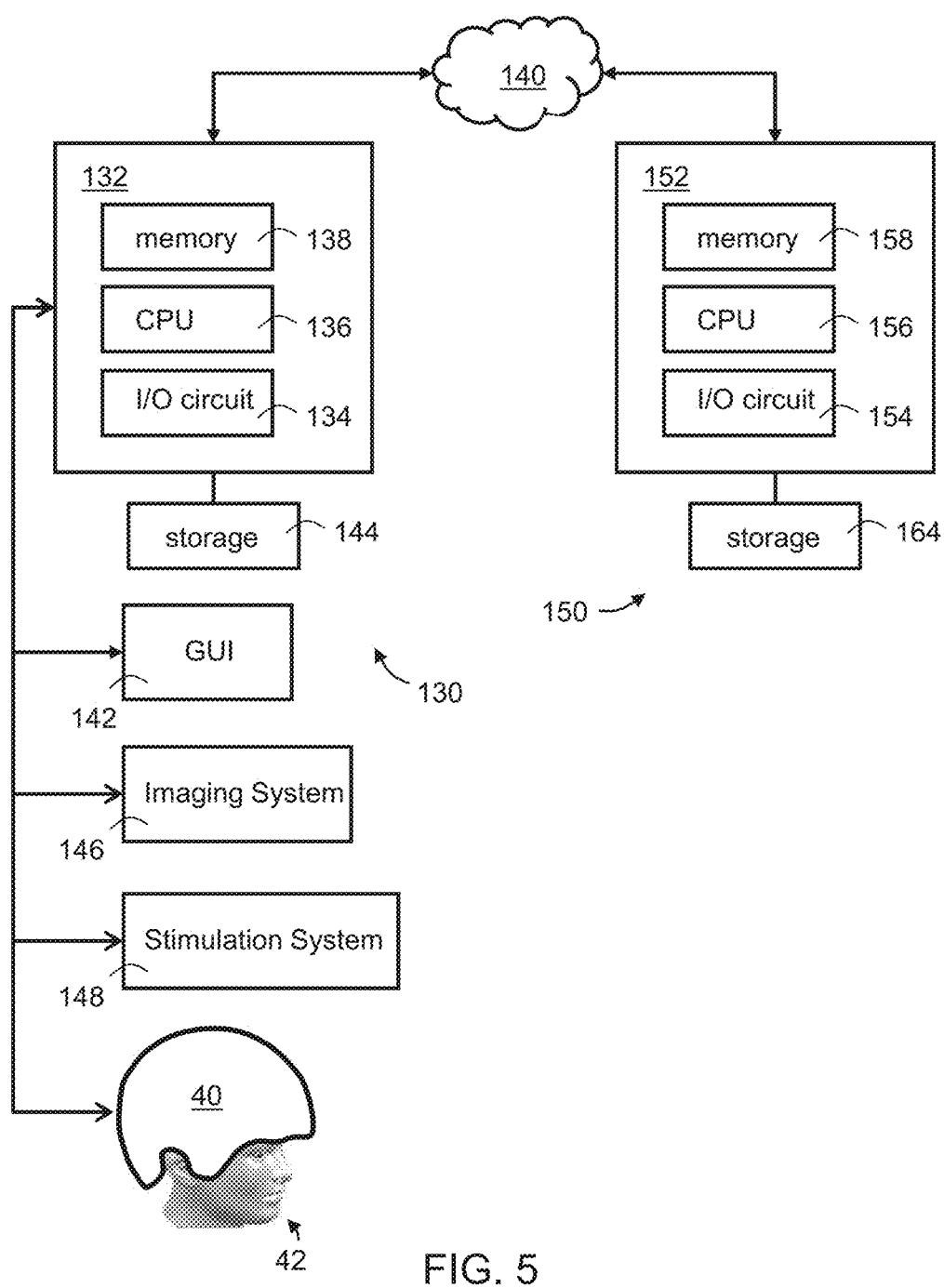
FIG. 5 is a schematic illustration of a system, which can be used according to some embodiments of the present invention to execute the methods described in FIGS. 2-4.

Displacement sensors 66 optionally and preferably transmit signals pertaining to the displacement of the neurophysiological sensors to controller 64 and/or to an I/O circuit of a hardware processor (not shown, see FIG. 5). Also contemplated, are embodiments in which sensors 66 transmit the signals to controller 64 which in turn transmits them to the hardware processor.

Figure 2:
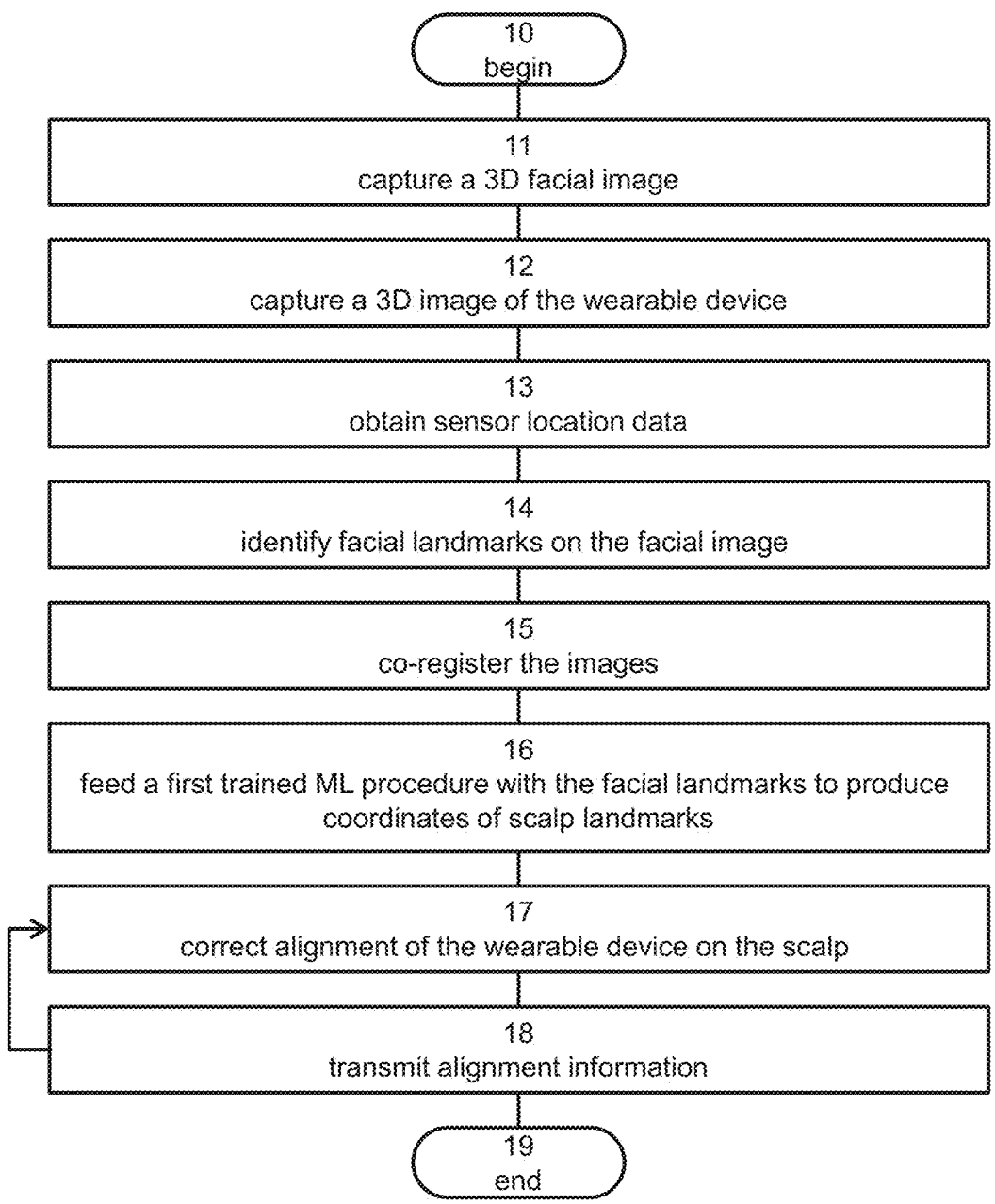
FIG. 2 is a flowchart diagram of a method suitable for aligning a wearable device, according to some embodiments of the present invention.

In operational phase, the wearable device 40 is used for obtaining signals from the brain of subject 42 in order to determine or estimate the condition and/or function of the subject's brain. Prior to this operational phase, the wearable device 40 is optionally and preferably aligned on the head of subject 42. FIG. 2 is a flowchart diagram of a method suitable for aligning a wearable device, such as, but not limited to, wearable device 40, on a head of a subject, according to various exemplary embodiments of the present invention. It is to be understood that, unless otherwise defined, the operations described herein below can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

At least part of the operations described herein can be implemented by a data processor having image processing capabilities, e.g., a dedicated circuitry or a general-purpose computer, configured for receiving data and executing the operations described below. At least part of the operations can be implemented by a cloud-computing facility at a remote location.

Computer programs implementing the method of the present embodiments can commonly be distributed to users by a communication network or on a distribution medium such as, but not limited to, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. During operation, the computer can store in a memory data structures or values obtained by intermediate calculations and pulls these data structures or values for use in subsequent operation. All these operations are well-known to those skilled in the art of computer systems.

Processing operations described herein may be performed by means of processer circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

The method begins at 10 and continues to 11 at which a three-dimensional (3D) image of a face of the subject (e.g., subject 42) is captured, and to 12 at which a 3D image of the wearable device (e.g., wearable device 40) is captured. The 3D image of the wearable device is preferably captured while wearable device is worn by the subject.

It is appreciated that a three-dimensional image is typically a two-dimensional image or set of images which, in addition to indicating the lateral extent of the face or wearable device, further indicates the relative or absolute distance of points on the face or wearable device, from some reference point, such as the location of the imaging device (e.g., coordinates of the camera). Thus, a three-dimensional image typically includes information residing on a non-planar surface of a three-dimensional body and not necessarily in the bulk. Yet, it is commonly acceptable to refer to such image as "three-dimensional" because the non-planar surface is conveniently defined over a three-dimensional system of coordinate.

The 3D image can be captured using any sensor array readout from which 3D structure can be inferred.

The 3D images are defined over a plurality of picture-elements (e.g., pixels, arrangements of pixels) each storing an intensity value, and information pertaining to a distance of a respective point over the imaged surface (the face of the subject and/or the wearable device, in the present case) from a reference plane, which is typically the image plane. Optionally, but not necessarily, each pixel can be associated with three or more digital intensity values sampling the amount of light at three or more different color channels (e.g., red, green and blue). The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the terms "image" as used herein also encompasses a mathematical object which does not necessarily correspond to a physical object. The captured images certainly do correspond to physical objects which are the face of the subject and the wearable device worn by the subject.

The 3D images can be still images, or they can be video images. When the 3D images are video images, the method is optionally and preferably executed for each of a plurality of frames belonging to the video images.

Any of the 3D images can be captured by capturing a plurality of two-dimensional images of the surface to be imaged (the face of the subject and/or the wearable device, in the present case), from a plurality of viewpoints, and determining the 3D shape of the surface by analyzing the differences between the images. This imaging technique is referred to in the literature as stereoscopic imaging. Typically, this stereoscopic imaging employs two or more imaging systems mounted at spaced apart locations. Alternatively, stereoscopic imaging can be done using a single imaging system which sequentially images the surface from a plurality of viewpoints. The imaging systems have partially overlapping fields of view, and an image processor connected to receive images from each of the imaging systems compares the images to derive the 3D shape of the surface. Information such as the distances to points over the surface, dimensions and orientations of surface portions can be determined by triangulation. Stereoscopic imaging is called "passive" since it requires only ambient light for generating the 3D image.

Alternatively, a range imaging technique, such as structured light imaging, or light field imaging, or time-of-flight imaging can be employed.

Structured light imaging is based on the observation that a stripe projected on a non-planar surface intersects the surface at a curve which can reflect the characteristic of surface. An image of the curve can be acquired by an imaging system to form a plurality of measured points on the plane of imaging system, referred to as the imaging plane. The curve and the light source producing the stripe define another plane referred to as the light plane. There is a projected correspondence between points on the light plane and points on the imaging plane. Based on the projected correspondence the 3D coordinates of the points on the non-planar surface can be determined. In order to acquire image of the entire surface, coded patterns are projected instead of a single stripe, hence the terms "structured light." This technique is called "active" since it requires light other than the ambient light In light field imaging, an optical mask or an array of micro-lenses is incorporated in an imaging system. A light beam from the surface to be imaged passes through the mask and/or array of micro-lenses, which vary the light field in a manner that depends on the range and/or direction from which the light field arrives at the imaging system. The range and/or direction information can then be extracted from the resulting image to provide the shape of the surface. This technique is also called "passive" since it requires only ambient light for generating the 3D image.

In time-of-flight imaging, light is transmitted towards the surface to be imaged, and the camera measures the time delay between the transmitted and received light. As light propagates at a fixed speed, one can measure distances with this method. This technique is also called "active" since it requires light other than the ambient light Combinations of the aforementioned techniques are also contemplated.

The method optionally and preferably continues to 13 at which sensor location data, describing the locations of the EEG sensors over the surface of the wearable device are obtained. Preferably, the sensor location data are obtained, by accessing a computer readable medium storing the sensor location data prepared in advance and reading the data into the memory of a computer. The sensor location data can be prepared during the manufacturing or design of the wearable device. For example, when the wearable device is designed by a Computer Aided Design (CAD) software, the sensor location data can be extracted from the CAD data files. The sensor location data can alternatively be extracted by image processing of, for example, a three-dimensional image of the inner surface of the wearable device. Such a three-dimensional image can be captured and processed in advance, or be executed by the method.

The method preferably continues to 14 at which facial landmarks 60 (see FIG. 1A) are identified on the 3D image of the face of the subject. The facial landmarks can include any of the anatomical features that are recognizable on a facial image, such as, but not limited to, landmarks that characterize the positions and silhouettes of one or more of the eyes, the eyebrows, the nose, the mouth, the lips, the jaw line, the ears and the like. The number of facial landmarks is preferably sufficiently large (e.g., at least 20 or at least 40 or at least 60) to allow reconstructing the shape of the scalp of the subject. In experiments performed by the present Inventor, the 60 facial landmarks defined in Sagonas et al., Conference: Proceedings of the 2013 IEEE International Conference on Computer Vision Workshops, doi: 10.1109/ICCVW.2013.59, the contents of which are hereby incorporated by reference. The landmarks can be identified using dedicated image processing software as known in the art. For example, in some embodiments of the present invention the image processing procedure described in Bulat et al., www(dot)arxiv(dot)org/pdf/1703.07332(dot) pdf, which is incorporated herein by reference, is employed. Also contemplated is the image processing procedure described in U.S. Pat. No. 10,380,414 and U.S. Published Application No. 20140050358.

The identified facial landmarks form a set $S_{xyz}$ of points, where the size (the number of elements) of the set is the number of identified landmarks, and each element of the set includes the coordinates of a respective facial landmark over a three-dimensional coordinate system.

At 15 the 3D image of the face of the subject, and the 3D image of the wearable device are co-registered. This is preferably done based on the identified facial landmarks, and optionally and preferably also based on one or more predefined reference points 52 (see FIG. 1A) of, e.g., different colors or shapes on the wearable device. The reference points 52 can optionally and preferably by active light sources (e.g., LEDs) that generate light during the image capture, and can be identified by image processing according to one or more light features such as light pattern and/or light color.

The method proceeds to 16 at which a first trained machine learning (ML) procedure is fed with the facial landmarks.

As used herein the term "machine learning" refers to a procedure embodied as a computer program configured to induce patterns, regularities, or rules from previously collected data to develop an appropriate response to future data, or describe the data in some meaningful way.

Representative examples of machine learning procedures suitable for the present embodiments, include, without limitation, clustering, association rule algorithms, feature evaluation algorithms, subset selection algorithms, support vector machines, classification rules, cost-sensitive classifiers, vote algorithms, stacking algorithms, Bayesian networks, decision trees, neural networks, instance-based algorithms, linear modeling algorithms, k-nearest neighbors (KNN) analysis, ensemble learning algorithms, probabilistic models, graphical models, logistic regression methods (including multinomial logistic regression methods), gradient ascent methods, singular value decomposition methods and principle component analysis.

In some embodiments of the present invention the first ML procedure is procedure known as an artificial neural network.

Artificial neural networks are a class of algorithms based on a concept of inter-connected "neurons." In a typical neural network, neurons contain data values, each of which affects the value of a connected neuron according to connections with pre-defined strengths, and whether the sum of connections to each particular neuron meets a pre-defined threshold. By determining proper connection strengths and threshold values (a process also referred to as training), a neural network can achieve efficient recognition of images and characters. Oftentimes, these neurons are grouped into layers in order to make connections between groups more obvious and to each computation of values. Each layer of the network may have differing numbers of neurons, and these may or may not be related to particular qualities of the input data.

In one implementation, called a fully-connected neural network, each of the neurons in a particular layer is connected to and provides input value to those in the next layer. These input values are then summed and this sum compared to a bias, or threshold. If the value exceeds the threshold for a particular neuron, that neuron then holds a positive value which can be used as input to neurons in the next layer of neurons. This computation continues through the various layers of the neural network, until it reaches a final layer. At this point, the output of the neural network routine can be read from the values in the final layer.

Unlike fully-connected neural networks, convolutional neural networks (CNNs) operate by associating an array of values with each neuron, rather than a single value. Convolutional neural networks (CNNs) include one or more convolutional layers in which the transformation of a neuron value for the subsequent layer is generated by a convolution operation. The convolution operation includes applying a convolutional kernel (also referred to in the literature as a filter) multiple times, each time to a different patch of neurons within the layer. The kernel typically slides across the layer until all patch combinations are visited by the kernel. The output provided by the application of the kernel is referred to as an activation map of the layer. Some convolutional layers are associated with more than one kernel. In these cases, each kernel is applied separately, and the convolutional layer is said to provide a stack of activation maps, one activation map for each kernel. Such a stack is oftentimes described mathematically as an object having D+1 dimensions, where D is the number of lateral dimensions of each of the activation maps. The additional dimension is oftentimes referred to as the depth of the convolutional layer.

In some embodiments of the present invention the ML procedure is a CNN.

The ML procedure used according to some embodiments of the present invention is a ML procedure that is trained to produce coordinates of scalp landmarks 62 (see FIG. 1B). Preferably, the ML procedure is trained to provide output indicative of at least the shape of the scalp, based on the facial landmarks. For example, the ML procedure can be trained to output parameters characterizing a transformation (e.g. an affine transformation) between the scalp and a template scalp.

The template scalp can be obtained from a library of image templates prepared by processing images obtained using a medical imaging technique, such as, but not limited to, computerized tomography (CT), Magnetic Resonance Imaging (MRI), ultrasound imaging, and the like. Such a library of image templates typically defines the shape of the image templates stored therein in a standardized space, e.g., the Montreal Neurological Institute (MNI) space. A representative library of image templates which can be used according to some embodiments of the present invention is found in www(dot)openneuro(dot)org/public/datasets (Gorgolewski, K., Esteban, O., Schaefer, G., Wandell, B., & Poldrack, R. (2017). OpenNeuro—a free online platform for sharing and analysis of neuroimaging data. Organization for human brain mapping. Vancouver, Canada, 1677(2)).

The template scalp is preferably annotated with a plurality of scalp template landmarks. The method can access a computer readable medium storing the template scalp and apply the transformation (e.g. affine transformation) to the template scalp to provide the shape of scalp.

The obtained shape of the scalp can comprise spatial information describing the non-planar surface that forms the scalp. Generally, the non-planar surface is a two-dimensional object embedded in a three-dimensional space. Formally, a non-planar surface is a metric space induced by a smooth connected and compact Riemannian 2-manifold. Ideally, the geometric properties of the non-planar surface would be provided explicitly for example, the slope and curvature (or even other spatial derivatives or combinations thereof) for every point of the non-planar surface. Yet, such information is rarely attainable and the spatial information is provided for a sampled version of the non-planar surface, which is a set of points on the Riemannian 2-manifold and which is sufficient for describing the topology of the 2-manifold. Typically, the spatial information of the non-planar surface is a reduced version of a 3D spatial representation, which may be either a point-cloud or a 3D reconstruction (e.g., a polygonal mesh or a curvilinear mesh) based on the point cloud. The 3D spatial representation is expressed via a 3D coordinate system, such as, but not limited to, Cartesian, Spherical, Ellipsoidal, 3D Parabolic or Paraboloidal coordinate 3D system.

From the shape of the scalp, the coordinates of the scalp landmarks can be obtained, for example, by applying the same transformation (e.g. the same affine transformation) to the annotated scalp landmarks of the scalp template. Alternatively, the ML procedure can be trained to produce a set of scalp landmarks directly, optionally without providing parameters that characterize the transformation.

The scalp landmarks optionally and preferably include one or more landmark points that are commonly used to designate desired electrode location in conventional EEG positioning, but other landmark points are also contemplated. Representative examples of landmark points suitable according to some embodiments of the present invention to be used as scalp landmarks include, without limitation, points along the longitudinal fiducial line and the transversal fiducial line of the international 10-20 EEG scheme. For example, the landmark points can include the endpoints of these two lines (nasion, inion, right pre-auricular point and the left pre-auricular point). Thus, for example, the scalp template can be annotated with a plurality of scalp template landmarks along the longitudinal and transversal fiducial lines, and the method can apply a transformation (e.g. an affine transformation) to one or more of these scalp template landmarks to provide the scalp landmarks of the subject.

The ML procedure (e.g., the CNN) can be trained by feeding an ML training program with training data. The training data can include labeled sets of facial landmarks obtained from a cohort of subjects. Each set of the training data can be labeled by, or associated with, a corresponding set of scalp landmarks, or, more preferably, a corresponding set of parameters characterizing an affine transformation between the scalp of the subject and the template scalp, preferably an inverse affine transformation $A^{-1}$, that transforms from the standardized space to the native space of the subject in which the 3D images are defined. The ML training program adjusts the ML parameters (e.g., convolutional kernels, bias matrices, weights) of the ML producer so as to produce an output that predicts, for each set $S_{xyz}$ of facial landmarks, the scalp landmarks or the affine transformation parameters that are as close as possible to its label. Once the training data are fed, the ML training program generates a trained ML procedure which can then be used without the need to re-train it. When the trained ML procedure is a trained CNN, the final result of the training is a trained CNN having an input layer, at least one, more preferably a plurality of, hidden layers, and an output layer, with adjusted weights assigned to each component (neuron, layer, kernel, etc.) of the network.

Since the 3D image of the face of the subject is co-registered with the 3D image of the wearable device, and since the scalp landmarks are expressed in the native space at which the 3D images are captured, the coordinates of the scalp landmarks as obtained at 16, and the locations of the EEG sensors, as obtained at 13, are all in the same system of coordinates. The method thus proceeds to 17 at which the alignment of the wearable device on the scalp is corrected to match the coordinates of the scalp landmarks with the locations of the EEG sensors.

In some embodiments of the present invention the wearable device 40 comprises a display 56 controlled by a circuit 58. In these embodiments, the method transmits 18 to circuit 58 alignment information pertaining to the alignment between the coordinates of the scalp landmarks and the locations of EEG sensors, for displaying of the alignment information on display 56. The alignment information can include a score pertaining to the alignment state and/or one or more graphical features that can aid the operator to properly align the wearable device 40 on scalp 44.

The correction and transmission 18 can be repeated to form an alignment-correction loop until the alignment is sufficient (e.g., the distances between the scalp landmarks and the locations of EEG sensors are, on the average, below a predetermined tolerance threshold). As a representative example of an alignment-correction loop, the display can present a graphical animation of the relative alignment between the scalp and the wearable device and update the animation while the operator corrects the alignment.

While FIG. 1A illustrates display 56 as being mounted on wearable device 40, need not necessarily be the case, since, for some applications, it may not be necessary for the display 56 to be mounted on wearable device 40. Some embodiments of the present invention contemplate using an external display, such as, but not limited to, a webcam or virtual reality googles or augmented reality googles or a phone camera, as display 56. In these embodiments wearable device 40 optionally and preferably communicates with the external display via a communication device (not shown) such as, but not limited to, Bluetooth or WiFi. These embodiments are useful in cases in which the subject 42 aligns the wearable device 40 on his or her own scalp. These embodiments are also useful when another individual aligns wearable device 40 on the clap of subject 42. For example, when display 56 includes augmented reality googles, display 56 can present the alignment information as computer generated perceptual information augmented on a real-world image of wearable device 40 as placed on the clap of subject 42.

The alignment correction can, in some embodiments of the present invention, also include individually varying the locations of the sensors of the wearable device, for example, by activating the actuators 50, so as to match the coordinates of the scalp landmarks with the varied locations. The varied locations can be calculated based on the locations before the activation of the actuators, and the extent of the variation applied by the actuators. For example, the method can receive signals from the actuators pertaining to locomotion vectors describing the variations of the electrodes 46 and add those locomotion vector to the locations in the native system of coordinates to provide the varied locations. Optionally and preferably the varied locations are received in closed loop, and the alignment of device 40 is corrected 17 also based on the varied locations. In embodiments of the invention in which device 40 comprises displacement sensors 66, the displacements of sensor bodies 54 of neurophysiological sensors 48 as measured by displacement sensors 66 can be used instead of, or in addition to, the locomotion vectors from the actuators. The advantage of using displacement sensors 66 is that they can reduce alignment errors in case the subject has large volume of hair, or a skull shape that has large deviation from the template head model.

Once the alignment is sufficient, the positions of the bodies 54 of sensors 48 relative to their relaxed state can be stored in a computer readable medium, and can be used as an initial state of the sensors at future uses of wearable device 40. These embodiments are particularly useful when wearable device 40 is used repeatedly by the same individual. Thus, upon initial placement of the wearable device 40 on scalp 44 the display 56 can present a message that the previous positions of the bodies 54 of sensors 48 are stored, and may offer the user with the option of using those saved position as the starting point for method 10. The display can present the message together with a GUI control using which the user can provide the desired input. The computer readable medium that stores the previous positions of the bodies 54 of sensors 48 can be within controller 64, or can be a separate storage medium (not shown) mounted on device 40, or can be external to device 40 but in communication therewith (see, for example, storage 144 in FIG. 5).

Preferably, once the alignment is completed the wearer does not move the wearable device 40 relative to scalp 44.

The method ends at 19.

Figure 3:
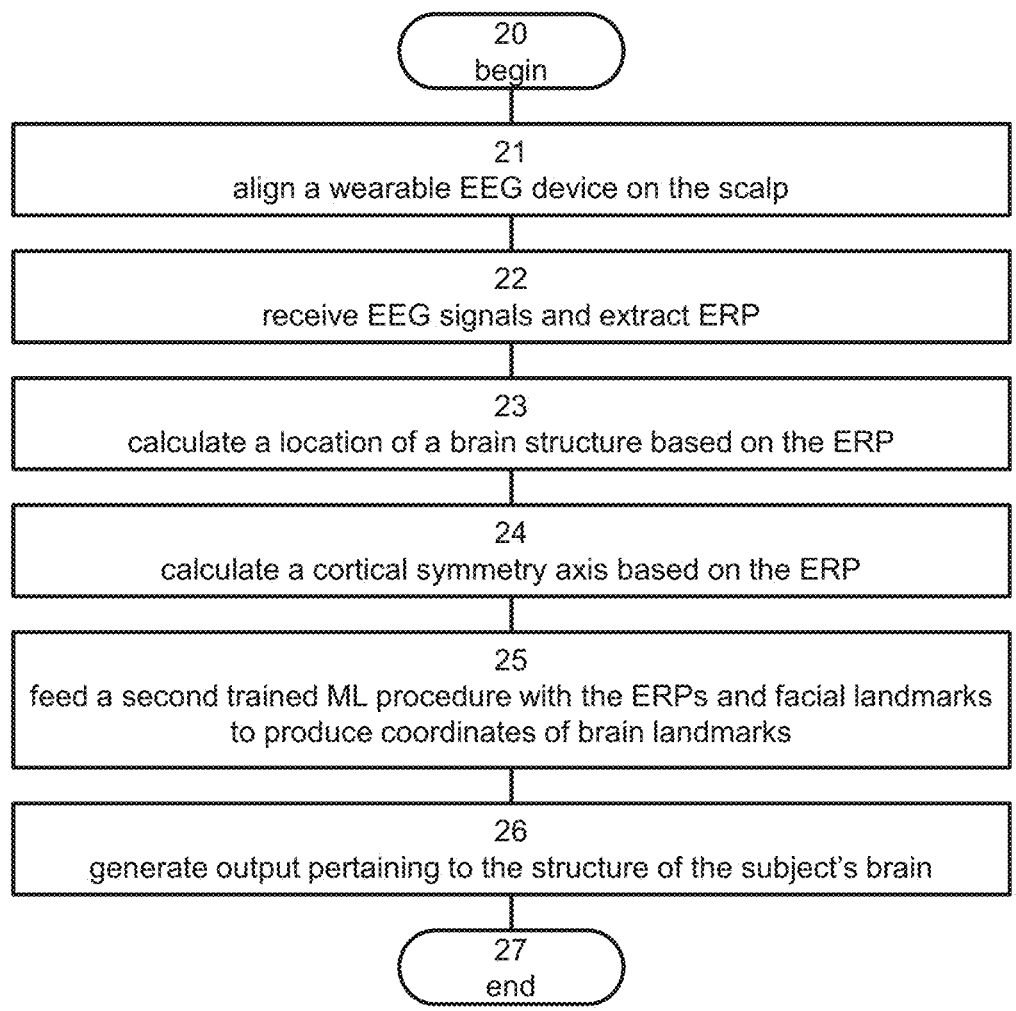
FIG. 3 is a flowchart diagram of a method suitable for estimating a brain structure of a subject, according to some exemplary embodiments of the present invention.

FIG. 3 is a flowchart diagram of a method suitable for estimating a brain structure of a subject, according to various exemplary embodiments of the present invention.

The method begins at 20 and optionally and preferably continues to 21 at which a wearable (e.g., device 40) is aligned on the scalp of the subject, such that scalp landmarks (e.g., one or more landmark points of the international 10-20 scheme) match locations of the EEG sensors of device 40. This is optionally and preferably done by executing one or more of the operations of method 10 described above.

The method optionally proceeds to 22 at which EEG signals are obtained from the sensors of the wearable device. The EEG signals can be Evoked Response Potential (ERP) signals, in which case the signals are responsive to sensory and/or haptic stimulation applied to the subject. The stimulation and the acquisition of signals from the sensors are preferably synchronized so as to allow the method to identify the brain's electrical activity that is responsive to the applied stimulus or stimuli.

An ERP (also known as evoked response field, ERF) is the body's psychophysiological response to a given stimulus. Since individual neurons have relatively little electrical activity associated with them, certainly not enough to be detected on the scalp, ERPs are recorded when neurons act synchronously, and the electric fields generated by each particular neuron are oriented in such a way that the effects on the scalp cumulate. Activity of neurons organized in a layered open field manner (neurons with dendrites and axons oriented in the same fashion) are typically picked up as an ERP.

Stimuli that cause ERPs can either be external, or internal. The detection of ERP signals is optionally and preferably performed based on signals that describe stimulation of the subject wearing the wearable device, which can be received, for example, from a system that generates the stimuli. Based on the signals that describe stimulation, the ERP signals are identified from the EEG signals. The applied simulation can be of any type, including, without limitation, somatosensory evoked potential (SSEP), brainstem evoked response audiometry, visual stimulation, tactile stimulation, olfactory stimulation and motor stimulation.

In some embodiments, several stimuli are applied to the subject, and the identification of the respective ERP is repeated for each of at least a few of the applied stimuli. Multiplicity of stimulations can be applied simultaneously or sequentially. In embodiments in which several types of stimuli are applied simultaneously, they are preferably applied according to a random or pseudo random schedule.

In some embodiments of the present invention the location of one or more brain structures is calculated 23 based on the ERPs. This can be done by triangulation. For example, SSEP stimulation can be applied, and the ERPs identified in response to this stimulation can be triangulated to estimate the location of the sensory cortex. Another example is a stimulus in which visual patterns are applied, and the ERPs identified in response to this stimulus can be triangulated to estimate the location of the visual cortex. Similarly, and the ERPs identified in response to an audio stimulus can be triangulated to estimate the location of the auditory cortex.

In some embodiments of the present invention the EEG signals are signals other than ERPs.

In some embodiments of the present invention a cortical symmetry axis is calculated 24 based on the ERPs. This can be done by analyzing bilateral centers of evoked activation, and using priors derived from a set of fMRI scans, for which the coordinates of the centroids of the activated brain structures (e.g., left motor cortex), and the plane separating the hemispheres and traversing the central sulcus are precomputed. In a preferred embodiment, the ERPs are fed to a machine learning procedure, trained to receive ERPs and responsively generate an output pertaining to the cortical symmetry axis. Such a machine learning procedure can be trained, for example, using a training set including a previously prepared dataset of dual fMRI and EEG recordings for the same evoked protocol.

The method optionally proceeds to 25 at which a second trained ML procedure is fed with the ERPs, and preferably also the facial landmarks obtained during the alignment 21. The second trained ML is preferably trained to produce coordinates of a plurality of brain landmarks, each brain landmark corresponding to a three-dimensional region within the brain of the subject. The second trained ML procedure can be of any of the aforementioned types of ML procedures. Preferably the second trained ML procedure is an artificial neural network, more preferably a CNN.

Aside for the ERPs, and optionally also the facial landmarks, the second trained ML procedure can be fed with additional data that may aid in determining the brain landmarks. For example, in various exemplary embodiments of the invention the second trained ML procedure is fed with the locations of sensors. When the actuators 50 are employed, the procedure is preferably fed with the varied locations, as further detailed hereinabove. When operations 23 and/or 24 are executed, the output of the respective operation (the location of the brain structure, and/or the cortical symmetry axis) can also be fed to the second trained ML procedure. Additional data that can be fed to the second trained ML procedure include, without limitation, demographic characteristics of the subject, and/or medical record pertaining to the subject (e.g., previous medical images, records of a disease or trauma which may affect the brain and/or scalp structure, etc.)

At 26 an output pertaining at least to a structure of the subject's brain is generated based on the brain landmarks. The output can include a list of the 3D regions received from the ML procedure, or, more preferably, may include a graphical representation including the spatial relations among all the 3D regions. In some embodiments of the present invention the second trained ML procedure is trained to provide output which comprises parameters characterizing a transformation of coordinates, such as, but not limited to, a nonlinear diffeomorphism, between a template head model and the head of the subject. The template head model can be obtained from a library of image templates which may be the same library described hereinabove, except that in this case, the method also considers the brain structures of the image templates, rather then only the scalp. A representative example of a library of image templates suitable for the present embodiments is found, for example, at www (dot)bic(dot)mni(dot)mcgill(dot)ca/ServicesAtlases/ICBM152NLin2009).

Operation 26 optionally and preferably creates a uniform coordinate system for the brain, the scalp and the headset, and optionally also the sensors and the electrodes, The template head model is preferably annotated with a plurality of brain template landmarks. The method can access a computer readable medium storing the template head model and apply a transformation of coordinates, to the template head model to provide a three-dimensional model describing shape of the scalp and the brain structure of the subject. In these embodiments, the output 26 optionally and preferably includes the obtained 3D model.

The method ends at 27.

Figure 4:
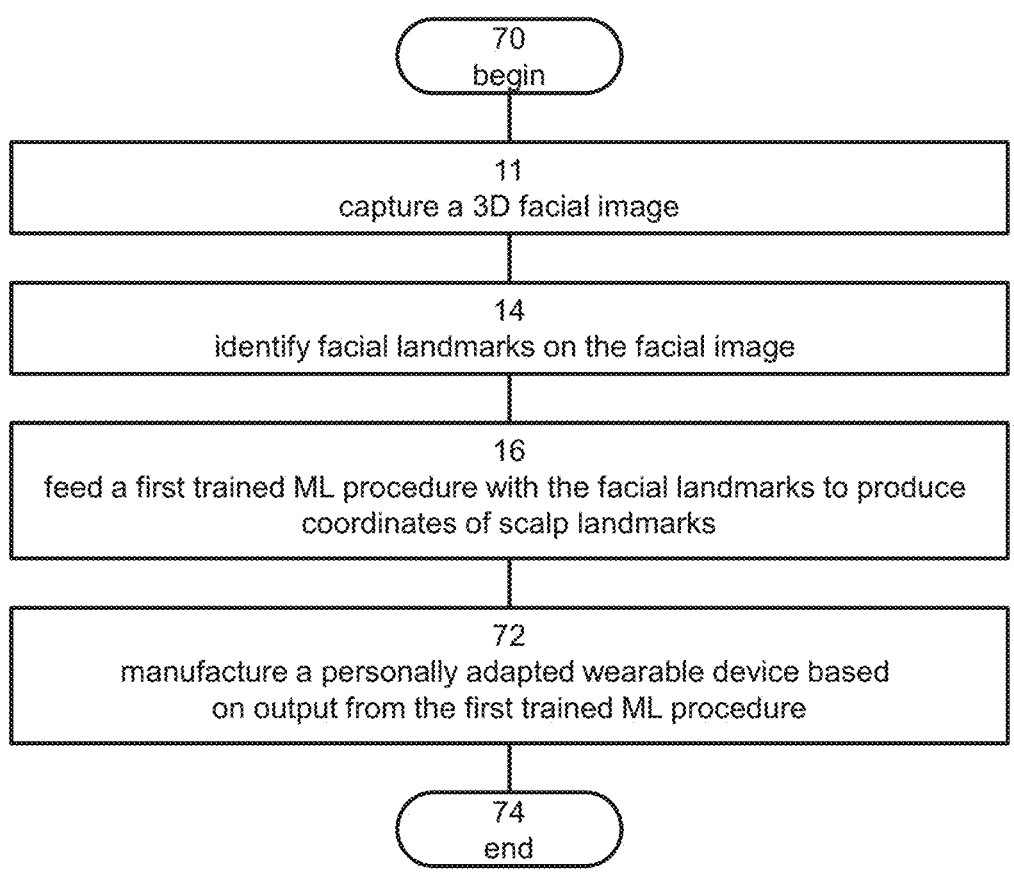
FIG. 4 is a flowchart diagram of a method suitable for manufacturing a personally adapted wearable device for EEG, according to some embodiments of the present invention.

FIG. 4 is a flowchart diagram of a method suitable for manufacturing a personally adapted wearable device for EEG, according to various exemplary embodiments of the present invention. The operational principles of the wearable device to be manufactured can be the same as those described above with respect to device 40.

The method begins at 70 and continues to 11 at which a 3D image of a face of the subject is captured, as further detailed hereinabove. The method preferably continues to 14 at which facial landmarks 60 (see FIG. 1A) are identified on the 3D image of the face of the subject, as further detailed hereinabove. The method proceeds to 16 at which the aforementioned first trained ML procedure is fed with the facial landmarks, as further detailed hereinabove. Preferably, the first trained ML procedure is a deep learning neural network, such as, but not limited to, a CNN. The ML procedure is trained to produce to coordinates of scalp landmarks 62 (see FIG. 1B), and optionally and preferably may alternatively or additionally be trained to output parameters characterizing a transformation between the scalp and a template scalp, as further detailed hereinabove. The method proceeds to 72 at which a personally adapted wearable device, such as device 40 described above, is manufactured based on the output from the first ML procedure. The shape and a size of the inner surface of the manufactured wearable device preferably substantially matches the shape and size of scalp of the subject, and the EEG sensors of the device are distributed over the surface of the device at locations that substantially match the landmark coordinates.

Operation 72 can be executed using any technique known in the art for manufacturing devices that are wearable on a scalp of an individual. Preferably, additive manufacturing is employed. Additive manufacturing is a technology enabling fabrication of arbitrarily shaped structures directly from computer data. The basic operation of additive manufacturing consists of slicing a three-dimensional computer model into thin cross sections, translating the result into two-dimensional position data and feeding the data to a controller of an additive manufacturing system which fabricates a three-dimensional structure in a layerwise manner. Representative examples of additive manufacturing techniques suitable for the present embodiments include, without limitation, three-dimensional inkjet printing, stereolithography, and fused deposition modeling.

The advantage of these embodiments is that the output of the ML procedure can be used to generate computer object data, such as, but not limited to, a CAD configuration represented on a computer readable medium in a format that is suitable for additive manufacturing, for example, Standard Tessellation Language (STL) or Stereo-Lithography Contour (SLC) format. The computer object data typically include a plurality of plurality of graphic elements (e.g., a mesh of polygons, non-uniform rational basis splines, etc.), which can be transformed to a grid of voxels defining the shape of the wearable device, including the locations of the EEG sensors, for example, using a slicing procedure that forms slice data describing a plurality of slices, each comprising a plurality of voxels describing a layer of the wearable device. From the slice data, the additive manufacturing software generates building instructions which are readable by a controller of the additive manufacturing system and which cause the equipment of the additive manufacturing system (e.g., printhead, extruder, laser scanner) to fabricate the wearable device in a layerwise manner.

In some embodiments of the present invention the method generates the computer object data automatically from the output of the ML procedure, without user intervention, and in some embodiments of the present invention the method also transmits the computer object data to a slicing procedure for automatically forming the slice data that describe the layers of the wearable device.

The method ends at 74.

FIG. 5 is a schematic illustration of a client computer 130 having a hardware processor 132, which typically comprises an input/output (I/O) circuit 134, a hardware central processing unit (CPU) 136 (e.g., a hardware microprocessor), and a hardware memory 138 which typically includes both volatile memory and non-volatile memory. CPU 136 is in communication with I/O circuit 134 and memory 138. Client computer 130 preferably comprises a graphical user interface (GUI) 142 in communication with processor 132. I/O circuit 134 preferably communicates information in appropriately structured form to and from GUI 142. Also shown, is a server computer 150 which can similarly include a hardware processor 152, an I/O circuit 154, a hardware CPU 156, a hardware memory 158. I/O circuits 134 and 154 of client 130 and server 150 computers can operate as transceivers that communicate information with each other via a wired or wireless communication. For example, client 130 and server 150 computers can communicate via a network 140, such as a local area network (LAN), a wide area network (WAN) or the Internet. Server computer 150 can be in some embodiments be a part of a cloud computing resource of a cloud computing facility in communication with client computer 130 over the network 140.

Further shown, is an imaging system 146 that is configured to capture three-dimensional images by any of the aforementioned techniques and that is associated with client computer 130. Imaging system 146 can be provided as a separate unit. In some embodiments of the present invention imaging system 146 includes one or more image capturing devices that are mounted on wearable device 40. The advantage of these embodiments is that such a configuration can facilitate automatic calibration of system 146 for generating the 3D images, and may optionally and preferably also aid in registering the image of the face with the image of the wearable device.

All types of communication between wearable device 40 and processor 132 can be via controller 64 of device 40 and I/O circuit 134 of processor 132.

GUI 142 and processor 132 can be integrated together within the same housing or they can be separate units communicating with each other. GUI 142 can optionally and preferably be part of a system including a dedicated CPU and I/O circuits (not shown) to allow GUI 142 to communicate with processor 132. Processor 132 issues to GUI 142 graphical and textual output generated by CPU 136. Processor 132 also receives from GUI 142 signals pertaining to control commands generated by GUI 142 in response to user input. GUI 142 can be of any type known in the art, such as, but not limited to, a keyboard and a display, a touch screen, and the like. In some embodiments, GUI 142 is a GUI of a mobile device such as a smartphone, a tablet, a smartwatch and the like. When GUI 142 is a GUI of a mobile device, processor 132, the CPU circuit of the mobile device can serve as processor 132 and can execute the code instructions described herein.

Client 130 and server 150 computers can further comprise one or more computer-readable storage media 144, 164, respectively. Media 144 and 164 are preferably non-transitory storage media storing computer code instructions as further detailed herein, and processors 132 and 152 execute these code instructions. The code instructions can be run by loading the respective code instructions into the respective execution memories 138 and 158 of the respective processors 132 and 152.

Each of storage media 144 and 164 can store program instructions which, when read by the respective processor, cause the processor to execute selected operations of the methods described herein. In some embodiments of the present invention, imaging system 146 captures a 3D image of the face of the subject 42, and a 3D image of wearable device 40 while being on a scalp of the subject 42, and transmits the images to processor 132 by means of I/O circuit 134. Processor 132 processes the image of face for identifying facial landmarks as further detailed hereinabove, and co-registers the images based on the identified facial landmarks and optionally and preferably also based on predefined reference points 52 (see FIG. 1A). Storage medium 144 can store sensor location data, describing the locations of the EEG sensors 48 (FIGS. 1B-D) over the surface of wearable device 40, and processor 132 can access medium 144 and load the sensor location data into its memory 138.

Storage medium 144 can also store the aforementioned first trained ML procedure, and processor 132 can load the first trained ML procedure from storage medium 144 into its memory 138, and execute it using the facial landmarks as the input to the procedure, so as to produce the coordinates of scalp landmarks. When the first trained ML procedure provides parameters characterizing a transformation between the of the subject's scalp and a template scalp, storage medium 144 also stores the template scalp, and data processor 132 load the template scalp from storage 144 into its memory 138 and applies the transformation to the template scalp to provide the shape of the subject's scalp.

Processor 132 can then then calculate the alignment state of device 40 by comparing the coordinates of the scalp landmarks with the locations of EEG sensors, and transmit the calculated alignment state to the circuit 58 (FIG. 1A) of device 40 for displaying the alignment state on display 56.

In some embodiments of the present invention computer 130 also transmits controls signals, for example, by means of I/O circuit 134, to the controller 64 (FIG. 1A) of device 40 for controlling the actuators 50 (FIGS. 1B-D) to vary the location of the EEG sensors 48, so as to match the coordinates of the scalp landmarks with the varied locations. Processor 132 can receive the varied locations recalculate the alignment state in closed loop based on varied locations, and transmit the recalculated alignment state to display 56 of device 40.

In some embodiments of the present invention computer 130 also controls a stimulation system 148 or GUI 142 to apply sensory and/or haptic stimulation to the subject 42. For example, computer 130 can control GUI 142 to apply a visual stimulus by displaying to the subject 42 visual patterns of specific images, and/or a sound stimulus by generating a specific sound. Stimulation system 148 can be configured to apply external stimulation to an organ of subject 42, e.g., an electric pulse the wrist, and computer 130 can control stimulation system 148 to apply such a stimulus. Computer 130 can control the electrodes 46 (FIGS. 1B-D) of device 40 to transmit an electric pulse to the scalp, in which case electrodes 46 serve both as sensing electrodes and as stimulation electrodes. Responsively to the sensory and/or haptic stimulation applied to the subject 42 (by any of GUI 142, stimulation system 148, and device 40), processor 132 can receive EEG signals from the EEG sensors 48 of device 40, e.g., by means of I/O circuit 134 and extract ERPs from the EEG signals as further detailed hereinabove.

Storage medium 144 can also store the aforementioned second trained ML procedure, and processor 132 can load the second trained ML procedure from storage medium 144 into its memory 138 and execute it using the ERPs and facial landmarks as the input to the procedure, so as to produce the coordinates of the brain landmarks, as further detailed hereinabove. Processor 132 can then generate output pertaining to a structure of the subject's brain and display this output on GUI 142.

When the second trained ML procedure provides parameters characterizing the transformation of coordinates (e.g., the nonlinear diffeomorphism) between a template head model and the head of the subject, processor 132, storage medium 144 also stores the template head model. Processor 132 can load the template scalp from storage 144 into its memory 138, apply the nonlinear diffeomorphism to the template head model to generate a 3D head model describing the shape of the subject's scalp and the structure of the subject's brain, and display the obtained 3D head model on GUI 142.

Alternatively, one or more of the operations described above can be executed by server computer 150, in which case the storage medium 164 of server computer 150 already contains information prepared in advance (e.g., sensor location data, first trained ML procedure, second trained ML procedure, templates). For example, processor 132 can transmit the 3D images over network 140 to server computer 150, and computer 150 can receive the images, calculate the alignment state of device 40, and transmit it back to computer 132 for displaying it on display 56. Processor 132 can also execute a stimulation procedure as further detailed hereinabove, receive the EEG signals in response to the stimulation, and transmit the EEG signals or ERPs extracted from the EEG signals to server computer 150. Server computer 150 can calculate the structure of the subject's brain, and more preferably a 3D model describing both the shape of the subject's scalp and the structure of the subject's brain, as further detailed hereinabove, and transmit it back to computer 132 for displaying it on GUI 142.

The technique of the present embodiments is optionally and preferably fully automatic. Preferably, the technique does not require manual placement of fiducials. The technique of the present embodiments allows for accurate electrode placement through real-time feedback, is guided by a database of brain images, and is optimized for individual variance.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Prototype System

Several approaches have been proposed to reproducibly position EEG electrodes. Jasper et al. suggested placing 21 electrodes according to the international "10-20" scheme, which relies on the manual identification of four external anatomical landmarks [Klem, G. H., Luders, H. O., Jasper, H. H. & Elger, C. The ten-twenty electrode system of the International Federation. The International Federation of Clinical Neurophysiology. Electroencephalography and clinical neurophysiology. Supplement 52, 3-6 (1999)]. The 10-20 scheme places the electrodes according to a pre-specified model with distances of 10% and 20% over the scalp, relative to the abovementioned anatomical landmarks. Other uses require substantially denser electrode arrays according to extensions of the 10-20 scheme or more uniformly dense and approximately equidistant arrangements [Keil, A, et al. Committee report: publication guidelines and recommendations for studies using electroencephalography and magnetoencephalography. Psychophysiology 51, 1-21, doi:10.1111/psyp.12147 (2014)\]. In all these methods, the anatomical landmarks need to be identified manually, and both the distances between the landmarks as well as each electrode location are measured manually as well.

He et al. proposed to measure the distance between fewer points and to interpolate the remaining positions [He, P. & Estepp, J. R. A practical method for quickly determining electrode positions in high-density EEG studies. Neuroscience letters 541, 73-76, doi:10.1016/j.neulet.2013.02.028 (2013)]. The Inventor of the present invention realized that these manual measurement techniques remain laborious and require experience, fine motor skills, and patience on the side of both researcher and subject. Many researchers utilize flexible fabric caps with electrodes mounted at fixed locations, where the cap manufacturer has placed the electrodes approximately at the locations of the 10-20 system. The Inventor of the present invention realized that these solutions are far from being optimal since, although these caps exist for different head circumferences (typically in steps of 2 cm) and have some flexibility, the expected average difference between a subject's head circumference and the best fitting cap is still 0.5 cm. Furthermore, caps are designed and manufactured to fit a typical head, whereas individuals' head shapes differ, and are oftentimes poorly aligned with the head.

Xiao et al. suggested a semi-automatic positioning scheme, which reconstructs the 10/20 head geometry followed by the location of the 10/20 positions [Xiao, X. et al. Semi-automatic 10/20 Identification Method for MRI-Free Probe Placement in Transcranial Brain Mapping Techniques. Frontiers in neuroscience 11, 4, doi:10.3389/fnins.2017.00004 (2017)]. However, the Inventor realized that there is still a problem with this method as it requires manual identification of the four anatomical known landmarks.

Also known is a tool referred to as the Phloem's electromagnetic digitizer [Swerdloff, S. J., Ruegsegger, M. & Wakai, R. T. Spatiotemporal visualization of neuromagnetic data. Electroencephalography and clinical neurophysiology 86, 51-57, doi:10.1016/0013-4694(93)90066-5 (1993).]. This tool comprises a transmitter that produces an electromagnetic field at multiple frequencies, and one or multiple probes that act as the receiver. The position of the receiver is localized relative to the transmitter based on the distribution of the electromagnetic fields. However, the Inventor of the present invention found that this device suffers from problems of electromagnetic distortion by large metal objects, and the requirement to execute manual recording, which is associated not only with effort, requires skill, but also suffers from inherent inaccuracy [Fekete, T., Rubin, D., Carlson, J. M., & Mujica-Parodi, L. R. (2011). A stand-alone method for anatomical localization of NIRS measurements. NeuroImage, 56(4), 2080-2088. doi:10.1016/j.neuroimage.2011.03.068].

Echallier and Perrin proposed a computer-assisted electrode-positioning system. An ultrasonic digitizer was used to define a reference coordinate system based on the aforementioned four anatomical landmarks [Echallier, J. F., Perrin, F. & Pernier, J. Computer-assisted placement of electrodes on the human head. Electroencephalography and clinical neurophysiology 82, 160-163, doi:10.1016/0013-4694(92)90161-a (1992)]. However, the Inventor of the present invention found that the ultrasound measurements through air are affected by environmental factors that impose limits on the practical value of this technique. Another way to localize electrode positions, is using contrast-rich markers which are visible in MRI, e.g. capsules filled with a fatty substance [Lagerlund, T. D. et al. Determination of 10-20 system electrode locations using magnetic resonance image scanning with markers. Electroencephalography and clinical neurophysiology 86, 7-14, doi: 10.1016/0013-4694(93)90062-z (1993)]. However, the Inventor of the present invention found that this requires the availability of an MRI scanner close to the EBG setup, as well as laborious post processing which to date is not automated.

Also known is an approach referred to as photogrammetry. Using several photos taken from different angles, a 3D model of the head with the EEG cap can be constructed and subsequently used to localize electrode positions. Clausner et al. employed a single DSLR camera to localize electrodes [Clausner, T., Dalal, S. S. & Crespo-Garcia, M. Photogrammetry-Based Head Digitization for Rapid and Accurate Localization of EEG Electrodes and MEG Fiducial Markers Using a Single Digital SLR Camera. Frontiers in neuroscience 11, 264, doi:10.3389/fnins.2017.00264 (2017)], and Reis and Lochmann et al. used an infrared light motion capture system (IR-MOCAP) with 8 cameras [Reis, P. M. & Lochmann, M. Using a motion capture system for spatial localization of EEG electrodes. Frontiers in neuroscience 9, 130, doi:10.3389/fnins.2015.00130 (2015)]. Koessler et al. used an 3D scanner with reflective sensors and were able to automatically digitize and label EEG electrode positions [Koessler, L. et al. EEG-MRI co-registration and sensor labeling using a 3D laser scanner. Annals of biomedical engineering 39, 983-995, doi:10.1007/s10439-010-0230-0 (2011)].

Electromagnetic, ultrasound digitization and photogrammetry spatial localization error ranges between 5 and 15 mm. The Inventor of the present invention found that these EEG positioning procedures are very time-consuming, particularly when dealing with high-density montages, and require extensive contribution by the operator.

A prototype system designed according to some embodiments of the present invention is schematically illustrated in FIG. 6. Two video cameras (A and B) are used to generate 3D images of the head (C) of a subject, using an objective (D).

The prototype system was designed to perform automatic co-registration of the EEG sensors to the scalp and cortex using a combination of multiple view imaging, medical imaging (e.g., MRI, (and machine learning. The operational principles of the prototype system are illustrated in FIG. 8.

Concurrent video sequences of the subjects' head acquired from two or more cameras are mined to provide a set of l semi-frontal or profile or 3D facial landmarks shown in FIG. 7 in the presence of the objective (D), serving as a reference, or using pre-calibrated cameras. The Cameras can be external and/or embedded in the wearable device and/or a virtual reality goggles. A 3D landmark geometry can be inferred from the multiple views of the landmarks and brought to scale via the objective (D). Additional sensors such as, but not limited to, lasers, can also be embedded in the wearable device and be used to refine the landmark estimates. Using the first trained ML procedure the landmarks are utilized to estimate the location of predefined anatomical landmarks, e.g. Nz, A1, A2, the head circumference, and the shape of the scalp.

The operational principles of the first trained ML procedure of the prototype system are illustrated in FIG. 9. The predictor variables I describe the semi-frontal and/or profile landmarks, and the target variables O describe the scalp and optionally and preferably additionally facial landmarks. The first trained ML procedure predicts the target variables O from the predictor variables I.

The first trained ML procedure is used for linking video sequence landmarks and MRI derived anatomical landmarks. Multiple view video sequences of the same heads can be mined for the same set of l landmarks and objective. For MRIs for which sequences are missing they are optionally and preferably generated by creating a head model and rendering it to produce qualitatively similar sequences to those obtained via cameras. A dataset of MRI anatomical scans can be mined for location of template anatomical markers, e.g. Nz, A1, A2, template head circumference, and the shape of the template scalp. The first ML procedure is trained to provide affine transformation between the template anatomical markers and the subject's native space as captured by the cameras.

Donning the EEG sensors of the wearable device allows co-registration of the EEG sensors and the facial landmarks into reference coordinates (RC) based on the multi-view images and capitalizing on capturing known landmarks on the wearable device and its known geometry.

The mounted wearable device provides the location of the k electrode tips relative to the scalp, adding an additional k landmarks for a total of n=k+l RC points. An estimate of a complete 3D head model of the subject (including, e.g., scalp, skull, cortex, and electrode tips) is derived via the second trained ML procedure utilizing the given n RC control points, and optionally and preferably the subject's demographics and medical record when available.

The operational principles of the second trained ML procedure of the prototype system are illustrated in FIG. 10. The predictor variables I describe the ERPs, and optionally and preferably the demographic data and/or medical record, and the target variables O describe the diffeomorphism T or its inverse $T^{-1}$ nonlinear diffeomorphism between a template head model and the head of the subject. The second trained ML procedure predicts the target variables O from the predictor variables I.

The second ML procedure is trained to predict $T^{-1}$ based on the n control points. The second ML procedure can also utilize additional information such as demographic and/or medical indicator variables, symmetry axis of the cortex inferred via analysis of the ERPs resulting from, e.g., application of localizing haptic and auditory stimuli, and locations of known brain structures (e.g., location of early cortices), obtained by triangulations of ERPs.

A data warehouse of anatomically registered brain monitoring data following the above procedure can be used for predicting the exact locus and number of electrodes to achieve optimal utility in a given scenario (e.g., seizure prediction, drone control etc.). Thus, after an initial diagnostic session with a general purpose wearable device, a personalized, optionally and preferably with a reduced number of EEG sensors can be fabricated and provided to an individual subject. The personalized wearable device can have EEG sensors that, together with a webcam or virtual reality googles or a phone camera, can allow the individual to accurately align the wearable device with the scalp.

Following is a description of the prototype system in greater detail.

All analyses described below were carried out employing a combination of Matlab and Python.

EXPERIMENTAL

The prototype in this Example was developed using a collection of 1526 MRI brain scans. The MRIs were processed to produce the following data:

1) Affine mappings A and their inverse $A^{-1}$ from each individual scan to the MNI nonlinear symmetric brain template [Fonov, V. S., et al., Unbiased nonlinear average age-appropriate brain templates from birth to adulthood. NeuroImage, 2009(47): p. S102].

2) Non-linear diffeomorphisms T and their inverse $T^{-1}$ morphing each linearly aligned brain to the abovementioned template using a method described in [Avants, B. B., et al., Symmetric diffeomorphic image registration with cross-correlation: evaluating automated labeling of elderly and neurodegenerative brain. Medical image analysis, 2008. 12(1): p. 26-41]. Additionally, Nz, In, A1, A2 (the nasion, inion, right and left preauricular points of the international 10-20 EEG scheme, respectively) for the MNI template were mapped to each original scan via applying $A^{-1}T^{-1}$ to produce Nz*, Iz*, A1*, A2

3) Head (scalp) models, $H_{tr}$, 3D point clouds were triangulated to produce a mesh representing individual scalps. Point clouds were obtained by thresholding MRIs according to luminance (tissue type is associated with generic values) using the Fieldtrip's default values [Oostenveld, R., et al., FieldTrip: open source software for advanced analysis of MEG, EEG, and invasive electrophysiological data. Computational intelligence and neuroscience, 2011. 2011], and initial meshes were created using iso2mesh [Fang, Q. and D. A. Boas. Tetrahedral mesh generation from volumetric binary and grayscale images. in 2009 IEEE International Symposium on Biomedical Imaging: From Nano to Macro. 2009. Ieee]. Next, meshes were denoised automatically calling MeshLab's server via python, first applying a screened Poisson surface reconstruction [Kazhdan, M. and H. Hoppe, Screened poisson surface reconstruction. ACM Transactions on Graphics (ToG), 2013. 32(3): p. 1-13.], followed by isotropic explicit remeshing [Alliez, P., et al. Isotropic surface remeshing. in 2003 Shape Modeling International. 2003. IEEE].

To provide the link between MRI scans and face images for datasets missing facial images, surrogate image sequences, mimicking sequences originating from stereo video capture were produced. Specifically, head models were rendered as perspectival images while systematically varying angle of head over a predetermined horizontal range (from about −65° to about 65°, in the present Example), with a random tilt over a vertical range (about 4-5°, in the present Example). The image was adjusted to simulate two cameras placed for stereo imaging, resulting in two image sequences representing the left and right cameras. To enable triangulation, the camera calibration process was simulated using the same camera configuration used for each MRI based stereo sequence, by generating image sequences of an objective of known dimensions. In the prototype system described in this Example, the objective was a checkerboard placed in different angles. From the calibration image sequences, a set of predefined landmarks were selected. In the prototype system described in this Example, of predefined landmarks were the corner points of the grid. Using the set of landmarks and the known distances between them, the camera parameters for all images, including the focal distances $f_x$, $f_y$, and optical centers $c_y$, $c_z$, of each camera, were estimated.

The sequences of face images were then analyzed. For each frame, 68 Semi-frontal facial landmarks following the definitions of [Sagonas, C., et al. 300 faces in-the-wild challenge: The first facial landmark localization challenge. in Proceedings of the IEEE International Conference on Computer Vision Workshops. 2013], were identified using a deep neural architecture described in [Bulat, A. and G. Tzimiropoulos. How far are we from solving the 2d & 3d face alignment problem? (and a dataset of 230,000 3d facial landmarks). in Proceedings of the IEEE International Conference on Computer Vision. 2017].

To reduce estimate inaccuracy, sequences of landmarks were smoothed per coordinate using a smoothing spline. As the network architecture produces a complete output by design, the set of landmark positions were pruned to exclude estimates for occluded landmarks (e.g., left landmarks when the face turned left). Specifically, pose was estimated for each frame, and if the face was estimated as exceeding a predetermined horizontal tilt (about 10°, in the present Example), the corresponding occluded landmarks were excluded from the respective frame. Pose was approximated by estimating coordinates of predetermined landmarks (the sides of the mouth, eyes, tip of nose, and nose bridge, in the present Example) and computing their correspondence to a generic template.

The camera parameters, together with the set of stereo landmarks allowed their triangulation. Initial approximation was improved via bundle adjustment [Triggs, B., et al. Bundle adjustment—a modern synthesis. in International workshop on vision algorithms. 1999. Springer]. The resulting coordinates were standardized by computing the rigid transformation taking them to the MNI template (thus defining up, down, left and right relative to the camera together with assuming origin is placed approximately in the middle of the head). The result was a set of 68 3D coordinates $S_{xyz}$.

The data were divided into training and test data sets following a ratio of 70/30, respectively. Each entry was a set $\{S_{xyz}^i, A_i^{-1}\}$ comprising the landmark estimates $S_{xyz}^i$ together with the inverse affine mapping $A_i^{-1}$ from the MNI template to the corresponding head model. The first ML procedure model was trained to predict $A_i^{-1}$ given $S_{xyz}^i$. This was done by employing a multi-target random forest regressor learned with a tenfold cross validation under Ray Tune's Bayesian hyperparameter optimization scheme. The estimate $\tilde{A}_i^{-1}$ was applied to a template head model $H_{tr}^{MNI}$ resulting in an estimated head model $\tilde{H}_{tr}^i$ of the individual's head. The estimated head geometry was then used for donning of the wearable device. This entailed correct positioning of the headset in relation to exact anatomical landmarks, e.g. In and Nz. This also entailed estimating the extent to which the electrode locations were varied in order to make contact with the scalp.

The wearable device was then brought into the cameras' field of view, and its image was co-registered to the face landmarks in standard coordinates. This was achieved by detecting reference points on the wearable device. The known geometry of the landmarks was used to make the estimates of the facial landmarks more accurate by adding them to the triangulation, and correcting the estimate via the affine map taking the wearable device landmarks to the ground truth coordinates (in standard representation). The wearable device was placed nearer to the head, and the sensors were extended in predefined sequences based on the estimate of the head shape $\tilde{H}_{tr}^i$. Given the known geometry of the wearable device, its position in standard coordinates, and the exact extension of the sensors the position of the electrodes tips was also known.

Optimal placement relative to the head model $\tilde{H}_{tr}^i$ was estimated as follows. Nz*, and Iz* were localized on $\tilde{H}_{tr}^i$ using the YZ slice plane containing both points. After deriving its contour, Nz and Iz were taken to be the points on the contour closest to Nz* and In*, under a predefined threshold (3 mm, in the present Example), that maximize the curvature of the contour. The model of the wearable device was then positioned relative to the plane passing between Nz and In (in standard coordinates this plane is unique together with the up direction, [0 0 1]) and the angle was adjusted to achieve minimal variance in sensor extension.

An additional signal from a 3D accelerometer, was used to determine the direction of gravity and to determine the accelerometer pitch and roll orientation angles. The advantage of using the signal from a 3D accelerometer is that it provides the orientation of the wearable device in terms of 3 axes of the canonical coordinates. This, together with the information derived from the camera as to the relationship of the head to the wearable device, allowed producing indicator signals that were transmitted to the display mounted on the wearable device, to direct the operator to place the wearable device in a predefined position relative to the head, ensuring optimal placement (centered and level in standard coordinates).

Initial extension of the sensors by the actuators was automatically adjusted to optimize EEG signal quality once the donning process was complete. Once signal (and hence sensor placement) has stabilized, the sensor points of contact with the head, (128 3D points in the present Example), in standard coordinates, were added to $S_{xyz}^i$ to form $\overline{S}_{xyz}^i$. Additionally, the points $\overline{A}_{xyz}^i$, representing known loci within the brain derived from functional mapping based triangulation were added to $\overline{S}_{xyz}^i$. Such data were derived from sensory and haptic stimulation to elicit ERPs. A set of ERPs allowed estimating known anatomical landmarks, e.g. the location of the lobes. To complete the data utilized to estimate the complete head structure, demographic information (e.g. age, sex, medical history) $D_{mg}^i$ can also be used as supplement data.

The nonlinear diffeomorphisms $T_i^{-1}$ were represented as 4D volumes, in which magnitude represents the warp at a given spatial location. To facilitate learning $T_i^{-1}$ volumes are coarse grained, to k points (50 points, in the present Example) of high contrast (local extrema of the spatial derivatives), to form vectors $Nl^i \in R^{4k}$.

The data were divided into training and test data sets following a ratio of 70/30, where each entry was a set $\{\overline{S}_{xyz}^i, \overline{A}_{xyz}^i, D_{mg}^i, Nl^i\}$, which comprised the scalp and brain landmark estimates, together with demographic data, and the coarse grained nonlinear diffeomorphism from the MNI template to the corresponding head model. The second ML procedure was trained to predict $Nl^i$ given $\{S_{xyz}^i, \overline{A}_{xyz}^i, D_{mg}^i\}$. This was done by employing a multi-target random forest regressor learnt with a tenfold cross validation under Ray Tune's Bayesian hyperparameter optimization scheme. The estimate $\tilde{A}_i^{-1}$ was applied to $H_{tr}^{MNI}$ resulting in an estimate $\tilde{H}_{tr}^i$ of the individual head. The model estimate $\hat{N}l^i$, was expanded to approximate $T_i^{-1}$ by polyharmonic splines. $\hat{T}_i^{-1}$ was then applied to the MNI template to provide a complete three-dimensional head model including the shape of the scalp and the structure of the brain.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of aligning a wearable device having a set of neurophysiological sensors distributed at a plurality of locations over its surface on a head of a subject, the method comprising:
   by an imaging system, capturing a three-dimensional (3D) facial image of the subject, and a 3D image of the wearable device while being placed on a scalp of the subject;
   by a data processor having a circuit, identifying facial landmarks on said facial image, and co-registering said images, based at least in part on said identified facial landmarks;
   by said data processor, feeding a first trained machine learning procedure with said facial landmarks to produce coordinates of scalp landmarks, calculating said alignment state by comparing said coordinates of said scalp landmarks and said locations of said neurophysiological sensors, and transmitting said alignment state to a display device mounted on said surface; and
   correcting an alignment of said wearable device on said scalp to match coordinates of said scalp landmarks with locations of said neurophysiological sensors.

2. The method according to claim 1, wherein said 3D images are video images, and the method is executed for each of a plurality of frames belonging to said video images.

3. The method according to claim 1, wherein said capturing of said 3D images comprises capturing a plurality of two-dimensional images from a plurality of viewpoints.

4. The method according to claim 1, wherein said capturing of said 3D images comprises range imaging.

5. The method according to claim 1, wherein said first trained machine learning procedure is trained to provide output indicative of at least a shape of said scalp, based on said facial landmarks.

6. The method according to claim 5, wherein said output comprises parameters characterizing a transformation between said scalp and a template scalp, and the method comprises accessing a computer readable medium storing said template scalp and applying said transformation to said template scalp, thereby providing said shape of said scalp.

7. The method according to claim 1, wherein said wearable device comprises a display controlled by a circuit, and the method comprises transmitting said circuit alignment information pertaining to an alignment between said coordinates of said scalp landmarks and said locations of said neurophysiological sensors, for displaying of said alignment information on said display.

8. The method 1 according to claim 1, comprising individually varying locations of said sensors with respect to said wearable device, to match said coordinates of said scalp landmarks with said varied locations.

9. The method according to claim 1, comprising individually varying locations of said sensors with respect to said wearable device, and receiving, in closed loop, said varied locations, wherein said correcting is based on position data of said sensors relative to said wearable device.

10. The method according to claim 1, comprising:
    obtaining neurophysiological signals from said sensors responsively to sensory and/or haptic stimulation applied to the subject, and extracting evoked response fields from said neurophysiological signals;
    feeding a second trained machine learning procedure with said evoked response fields and said facial landmarks, to produce coordinates of brain landmarks; and
    generating output pertaining at least to a structure of a brain of the subject based on said brain landmarks.

11. A system for neurophysiology, the system comprising:
    a wearable device having a set of neurophysiological sensors distributed at a plurality of locations over its surface;
    a display device mounted on said surface, and configured to display, while said wearable device is worn on a scalp of a subject, an alignment state of said wearable device with respect to said scalp;
    an imaging system for capturing a three-dimensional (3D) facial image of the subject, and a 3D image of said wearable device while being on a scalp of said subject; and
    a data processor having a circuit configured to process said facial image for identifying facial landmarks, to co-register said images based at least in part on said identified facial landmarks, to feed said facial landmarks into a first trained machine learning procedure producing coordinates of scalp landmarks, to calculate said alignment state by comparing said coordinates of said scalp landmarks and said locations of said neurophysiological sensors, and to transmit said alignment state to said display device.

12. The system according to claim 11, wherein said imaging system is configured to generate 3D video images, and said data processor is configured to process individual frames of said video images.

13. The system according to claim 11, wherein said first trained machine learning procedure is trained to provide output indicative of at least a shape of said scalp, based on said facial landmarks.

14. The system according to claim 11, wherein said wearable device comprises a set of controllable actuators for varying locations of said sensors with respect to said surface, and a controller configured for individually controlling each actuator or group of actuators, wherein said data processor is configured for transmitting a control signal to said controller to individually vary locations of said sensors so as to match said coordinates of said scalp landmarks with said varied locations.

15. The system according to claim 11, wherein said data processor is also configured to obtain neurophysiological signals from said sensors responsively to sensory and/or haptic stimulation applied to the subject, to extract evoked response fields from said neurophysiological signals, to feed said evoked response fields and said facial landmarks into a second trained machine learning procedure producing coordinates of brain landmarks, and to generate output pertaining at least to a structure of a brain of the subject based on said brain landmarks.

16. A system for determining an alignment state of a wearable device on a scalp of a subject, the wearable device having a set of neurophysiological sensors distributed at a plurality of locations over its surface, and a display device mounted on said surface, the system comprising:
- an imaging system for capturing a three-dimensional (3D) facial image of the subject, and a 3D image of the wearable device while being on a scalp of a subject; and
- a data processor having a circuit configured to process said facial image for identifying facial landmarks, to co-register said images based at least in part on said identified facial landmarks, to feed said facial landmarks into a first trained machine learning procedure producing coordinates of scalp landmarks, to calculate the alignment state by comparing said coordinates of said scalp landmarks and locations of said neurophysiological sensors, and to transmit the calculated alignment state to the display device.

17. The system according to claim 16, wherein said imaging system is configured to generate 3D video images, and said data processor is configured to process individual frames of said video images.

18. The system according to claim 16, wherein said first trained machine learning procedure is trained to provide output indicative of at least a shape of said scalp, based on said facial landmarks.

19. The system according to claim 16, wherein said wearable device comprises a set of controllable actuators for varying locations of said sensors with respect to said surface, and a controller configured for individually controlling each actuator or group of actuators, wherein said data processor is configured for transmitting a control signal to said controller to individually vary locations of said sensors so as to match said coordinates of said scalp landmarks with said varied locations.

20. The system according to claim 16, wherein said data processor is also configured to obtain neurophysiological signals from said sensors responsively to sensory and/or haptic stimulation applied to the subject, to extract evoked response fields from said neurophysiological signals, to feed said evoked response fields and said facial landmarks into a second trained machine learning procedure producing coordinates of brain landmarks, and to generate output pertaining at least to a structure of a brain of the subject based on said brain landmarks.

\* \* \* \* \*